United States Patent
Yoshikawa et al.

(10) Patent No.: US 11,811,062 B2
(45) Date of Patent: Nov. 7, 2023

(54) POSITIVE ELECTRODE FOR NON-AQUEOUS ELECTROLYTE SECONDARY BATTERY, AND NON-AQUEOUS ELECTROLYTE SECONDARY BATTERY, BATTERY MODULE AND BATTERY SYSTEM USING THE SAME

(71) Applicant: SEKISUI CHEMICAL CO., LTD., Osaka (JP)

(72) Inventors: Hikaru Yoshikawa, Tsukuba (JP); Yuichi Sabi, Tsukuba (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 17/768,941

(22) PCT Filed: Mar. 18, 2022

(86) PCT No.: PCT/JP2022/012904
§ 371 (c)(1),
(2) Date: Apr. 14, 2022

(87) PCT Pub. No.: WO2022/196830
PCT Pub. Date: Sep. 22, 2022

(65) Prior Publication Data
US 2023/0163291 A1    May 25, 2023

(30) Foreign Application Priority Data

Mar. 19, 2021  (JP) .................................. 2021-045810
Mar. 19, 2021  (JP) .................................. 2021-045971

(51) Int. Cl.
*H01M 4/58* (2010.01)
*H01M 4/62* (2006.01)
(Continued)

(52) U.S. Cl.
CPC ......... *H01M 4/5825* (2013.01); *H01M 4/525* (2013.01); *H01M 4/621* (2013.01);
(Continued)

(58) Field of Classification Search
None
See application file for complete search history.

(56) References Cited

U.S. PATENT DOCUMENTS

| | | | |
|---|---|---|---|
| 2002/0041998 A1* | 4/2002 | Hosoya | H01M 4/136 429/221 |
| 2009/0236564 A1* | 9/2009 | Yasunaga | C01B 25/45 252/506 |

(Continued)

FOREIGN PATENT DOCUMENTS

| | | |
|---|---|---|
| CN | 104518200 | 4/2015 |
| CN | 108713265 | 10/2018 |

(Continued)

OTHER PUBLICATIONS

Decision to Grant dated Jun. 15, 2021 in Japanese Application No. 2021-065303, with English translation.

(Continued)

*Primary Examiner* — Carlos Barcena
(74) *Attorney, Agent, or Firm* — Wenderoth, Lind & Ponack, L.L.P.

(57) ABSTRACT

A positive electrode (1) for non-aqueous electrolyte secondary batteries, including collector (11) and active material layer (12), wherein: integrated value (a) is 3 to 15% (for frequency of diameters of 1 μm or less), and frequency (b) is 8 to 20% (for diameter with a maximum frequency). A positive electrode (1) for non-aqueous electrolyte secondary batteries, including collector (11) and active material layer (12), wherein assuming two directions perpendicular to thickness direction of collector (11) and mutually orthogonal (Continued)

as first and second directions, average thickness a1, maximum thickness b1, minimum thickness c1 in thickness distribution in the first direction, and thickness d1 (largest absolute value of difference from a1) satisfy $0.990 \leq (d1/a1) \leq 1.010$ and $(b1-c1) \leq 5.0$ μm, and average thickness a2, maximum thickness b2, minimum thickness c2 in thickness distribution in the second direction, and thickness d2 (largest absolute value of difference from a2) satisfy $0.990 \leq (d2/a2) \leq 1.010$ and $(b2-c2) \leq 5.0$ μm.

11 Claims, 5 Drawing Sheets

(51) Int. Cl.
    *H01M 10/0585*      (2010.01)
    *H01M 10/0525*      (2010.01)
    *H01M 4/525*      (2010.01)
    *H01M 4/02*      (2006.01)

(52) U.S. Cl.
    CPC ....... *H01M 4/625* (2013.01); *H01M 10/0525* (2013.01); *H01M 10/0585* (2013.01); *H01M 2004/021* (2013.01); *H01M 2004/028* (2013.01)

(56) References Cited

U.S. PATENT DOCUMENTS

| | | | |
|---|---|---|---|
| 2010/0055569 A1* | 3/2010 | Divigalpitiya | H01M 4/5825 429/231.95 |
| 2012/0202114 A1 | 8/2012 | Madray et al. | |
| 2015/0079469 A1 | 3/2015 | Yoshikawa et al. | |
| 2017/0263932 A1* | 9/2017 | Kumakura | H01M 4/48 |
| 2019/0067677 A1 | 2/2019 | Nagata et al. | |
| 2019/0190008 A1 | 6/2019 | Taktzawa | |
| 2023/0044210 A1 | 2/2023 | Yamazaki et al. | |

FOREIGN PATENT DOCUMENTS

| | | | |
|---|---|---|---|
| CN | 110233259 | | 9/2019 |
| CN | 112335076 | | 2/2021 |
| CN | 112436134 | * | 3/2021 |
| JP | 2002151082 A | * | 5/2002 |
| JP | 2006-086057 | | 3/2006 |
| JP | 2008-243658 | | 10/2008 |
| JP | 2003-045432 | | 2/2013 |
| JP | 2013-201077 | | 10/2013 |
| JP | 2013-206598 | | 10/2013 |
| JP | 2015-56318 | | 3/2015 |
| JP | 2015-191881 | | 11/2015 |
| JP | 2017-188445 | | 10/2017 |
| JP | 2018-22656 | | 2/2018 |
| JP | 2018-163781 | | 10/2018 |
| JP | 2020-080255 | | 5/2020 |
| JP | 2020-187991 | | 11/2020 |
| WO | 2008/087966 | | 7/2008 |
| WO | 2015/005228 | | 1/2015 |

OTHER PUBLICATIONS

Notice of Allowance dated Jun. 15, 2021 in Japanese Application No. 2021-065303, with English translation.
Notice of Reasons for Rejection dated Feb. 15, 2022 in Japanese Application No. 2021-197099, with English translation.
International Search Report and Written Opinion of the International Searching Authority dated Aug. 22, 2022 in International (PCT) Application No. PCT/JP2022/012904.
Office Action dated Apr. 5, 2023 in related U.S. Appl. No. 17/862,858.
Extended European Search Report dated Mar. 7, 2023 in corresponding European Patent Application No. 22192653.8.
Decision to Grant dated Jun. 7, 2022 in Japanese Application No. 2021-197099, with English language translation.
First Office Action dated Jun. 2, 2023 in corresponding Chinese Patent Application No. 202280000742.7, with English language translation.
First Office Action dated Jun. 17, 2023 in corresponding Chinese Patent Application No. 202211093449.8, with English language translation.

\* cited by examiner

POSITIVE ELECTRODE FOR NON-AQUEOUS ELECTROLYTE SECONDARY BATTERY, AND NON-AQUEOUS ELECTROLYTE SECONDARY BATTERY, BATTERY MODULE AND BATTERY SYSTEM USING THE SAME

TECHNICAL FIELD

The present invention relates to a positive electrode for non-aqueous electrolyte secondary battery, as well as a non-aqueous electrolyte secondary battery, a battery module, and a battery system, each using the positive electrode.

Priority is claimed on Japanese Patent Application Nos. 2021-045810 and 2021495971, filed Mar. 19, 2021, the contents of which are incorporated herein by reference.

BACKGROUND ART

A non-aqueous electrolyte secondary battery is generally composed of a positive electrode, a non-aqueous electrolyte, a negative electrode, and a separation membrane (separator) installed between the positive electrode and the negative electrode.

A conventionally known positive electrode for a non-aqueous electrolyte secondary battery is formed by applying a composition composed of a positive electrode active material containing lithium ions, a conducting agent, and a binder to the surface of a metal foil (current collector).

Examples of the practically used positive electrode active material containing lithium ions include lithium transition metal composite oxides such as lithium cobalt oxide ($LiCoO_2$), lithium nickel oxide ($LiNiO_2$), and lithium manganese oxide ($LiMn_2O_4$), and lithium phosphate compounds such as lithium iron phosphate ($LiFePO_4$).

The Examples of PLT1 describe a positive electrode in which a positive electrode active material layer composed of a lithium transition metal composite oxide having a specific particle size distribution, a binder, and acetylene black as a conducting agent, is provided on an aluminum foil. This patent literature describes an example where the output density at 25° C. is improved by adjusting the particle size distribution of the lithium transition metal composite oxide, specifically by adjusting the DSEM to 1 to 7 μm, the D50/DSEM to 1 to 4, and the D90/D10 to 4 or less, in which the DSEM is an average particle size determined by electron microscopic observation, and the D50, D90 and D10 are, respectively, a 50% particle size, a 90% particle size and a 10% particle size in the volume-based cumulative particle size distribution.

Generally, the thickness of the positive electrode active material layer is assumed to be almost uniform because, for the application of a composition for producing a positive electrode, the amount of application is stabilized and the pressing force is also controlled to be constant during press after drying.

For example, PTL2, in its paragraph 0095, describes a method of measuring the thickness of the positive electrode active material layer, in which a film thickness of the metal foil is subtracted from an average value of the film thicknesses measured at three points on the positive electrode using a film thickness meter.

CITATION LIST

Patent Literature

PTL1 Japanese Patent Application Unexamined Publication No. 2017-188445

PTL2 Japanese Patent Application Unexamined Publication No. 2020-187991

SUMMARY OF INVENTION

Technical Problem

PTL1 focuses attention on the particle size distribution of the lithium transition metal composite oxide as a positive electrode active material, and does not pay attention to acetylene black as a conducting agent.

The method described in PTL1 is not necessarily satisfactory. Further, in recent years, the applications of non-aqueous electrolyte secondary batteries have been increasingly expanding. Therefore, further improvement of battery performance is required.

The present invention provides a positive electrode for a non-aqueous electrolyte secondary battery, which can improve the performance of a non-aqueous electrolyte secondary battery in respect of high-rate cycling performance.

Solution to Problem

The embodiments of the present invention are as follows.

[A1] A positive electrode for a non-aqueous electrolyte secondary battery, including a positive electrode current collector and a positive electrode active material layer provided on the positive electrode current collector, wherein:
the positive electrode active material layer includes a positive electrode active
material; and
an integrated value (a) is 3 to 15%, preferably 4 to 12%, more preferably 5 to 10%, which is an integrated value of frequency of particle diameters of 1 μm or less, and a frequency (b) is 8 to 20%, preferably 9 to 18%, more preferably 11 to 15%, which is a frequency of a diameter with a maximum frequency, each determined from a volume-based particle size distribution curve of particles present in the positive electrode active material layer.

[A2] The positive electrode according to [A1], wherein a single peak is present in the particle size distribution curve with frequency as an ordinate.

[A3] The positive electrode according to [A1] or [A2], which has a distribution width (c) of 2.0 to 20.0 μm, preferably 2.0 to 15.0 μm, more preferably 2.5 to 10.0 μm, which is a value obtained by subtracting a 10% diameter from a 90% diameter in a first normal distribution with a smaller average diameter of two normal distributions obtained by waveform separation of the particle size distribution curve with frequency as an ordinate.

[A4] The positive electrode according to any one of [A1] to [A3], which has an integrated value (d) of 1 to 30%, preferably 4 to 27%, more preferably 7 to 24%, which is an integrated value of frequency of particle diameters of 1 μm or less in a first normal distribution with a smaller average diameter of two normal distributions obtained by waveform separation of the particle size distribution curve with frequency as an ordinate.

[A5] The positive electrode active material according to any one of [A1] to [A4], wherein the positive electrode active material comprises a compound represented by a formula $LiFexM_{(1-x)}PO_4$, wherein $0 \leq x \leq 1$, M is Co, Ni, Mn, Al, Ti or Zr, and the compound is preferably lithium iron phosphate represented by LiFePO4.

[A6] The positive electrode according to any one of [A1] to [A5], wherein the positive electrode active material has, on at least a part of its surface, a coated section including a conductive material which preferably includes carbon, with the proviso that an amount of the conductive material is preferably 0.1 to 3.0% by mass, more preferably 0.5 to 1.5% by mass, even more preferably 0.7 to 1.3% by mass, based on a total mass of the positive electrode active material including the coated section.

[A7] The positive electrode according to any one of [A1] to [A6], wherein the positive electrode active material layer further includes a conducting agent, which is preferably at least one carbon material selected from the group consisting of graphite, graphene, hard carbon, Ketjen black, acetylene black, and carbon nanotube (CNT), wherein an amount of the conducting agent in the positive electrode active material layer is preferably 4 parts by mass or less, more preferably 3 parts by mass or less, even more preferably 1 part by mass or less, relative to 100 parts by mass of the positive electrode active material.

[A8] The positive electrode according to any one of [A1] to [A6], wherein the positive electrode active material layer does not contain a conducting agent.

[A9] The positive electrode according to any one of [A1] to [A8], wherein a current collector coating layer is present on a surface of the positive electrode current collector on a side of the positive electrode active material layer.

[A10] A non-aqueous electrolyte secondary battery, including the positive electrode of any one of [A1] to [A9], a negative electrode, and a non-aqueous electrolyte disposed between the positive electrode and the negative electrode.

[A11] A battery module or battery system including a plurality of the non-aqueous electrolyte secondary batteries of [A10].

[B1] A positive electrode for a non-aqueous electrolyte secondary battery, including a positive electrode current collector and a positive electrode active material layer provided on the positive electrode current collector, wherein:

the positive electrode active material layer includes a positive electrode active material; and when two directions perpendicular to a thickness direction of the positive electrode current collector and orthogonal to each other are defined as a first direction and a second direction, an average thickness a1, a maximum thickness b1 and a minimum thickness c1 in a thickness distribution in the first direction as well as a thickness d1 which is largest in terms of an absolute value of difference from the average thickness a1 satisfy in equations 1 and 2:

$$0.9905 \leq (d1/a1) \leq 1.010 \quad \text{Inequation 1, and}$$

$$(b1-c1) \leq 5.0 \ \mu m \quad \text{Inequation 2, and}$$

an average thickness a2, a maximum thickness b2 and a minimum thickness c2 in a thickness distribution in the second direction as well as a thickness d2 which is largest in terms of an absolute value of difference from the average thickness a2 satisfy inequations 3 and 4:

$$0.990 \leq (d2/a2) \leq 1.010 \quad \text{Inequation 3, and}$$

$$(b2-c2) \leq 5.0 \ \mu m \quad \text{Inequation 4,}$$

with the proviso that d1/a1 and d2/a2 in the formulae 1 and 3 are preferably 0.991 or more and 1.0 µm or less, more preferably 0.992 or more and 1.008 or less, and (b1-c1) and (b2-c2) in the formulae 2 and 4 are preferably 4.0 µm or less, more preferably 3.0 µm or less.

[B2] The positive electrode according to [B1], wherein the particles present in the positive electrode active material layer have a median diameter of 5.0 µm or less, preferably 1.0 µm to 5.0 µm, preferably 1.0 µm to 4.0 µm, more preferably 2.0 µm to 3.0 µm, based on a volume-based particle size distribution.

[B3] The positive electrode active material according to [B1] or [B2], wherein the positive electrode active material includes a compound represented by a formula LiFexM(1-x)PO$_4$, wherein 0≤x≤1, and M is Co, Ni, Mn, Al, Ti or Zr.

[B4] The positive electrode according to [B3], wherein the positive electrode active material is lithium iron phosphate represented by LiFePO$_4$.

[B5] The positive electrode according to any one of [B1] to [B4], wherein the positive electrode active material layer further includes a conducting agent.

[B6] The positive electrode according to [B5], wherein the conducting agent includes carbon, and is preferably at least one carbon material selected from the group consisting of graphite, graphene, hard carbon, Ketjen black, acetylene black, and carbon nanotube (CNT), wherein an amount of the conducting agent in the positive electrode active material layer is preferably 4 parts by mass or less, more preferably 3 parts by mass or less, even more preferably 1 part by mass or less, relative to 100 parts by mass of the positive electrode active material.

[B7] The positive electrode according to any one of [B1] to [B4], wherein the positive electrode active material layer does not include a conducting agent.

[B8] The positive electrode according to any one of [B1] to [B7], wherein the positive electrode active material has, on at least a part of its surface, a coated section including a conductive material.

[B9] The positive electrode according to [B8], wherein the conductive material includes carbon.

[B10] The positive electrode according to [B6] or [B9], wherein an amount of conductive carbon is 0.5 to 3.5% by mass, preferably 1.0 to 3.0% by mass, based on a total mass of the positive electrode active material layer.

[B11] The positive electrode according to any one of [B1] to [B10], wherein the positive electrode active material layer includes a binder, and an amount of carbon belonging to the binder is 0.1 to 2.0% by mass, preferably 0.2 to 1.7% by mass, more preferably 0.4 to 1.0% by mass, based on a total mass of the positive electrode active material layer.

[B12] The positive electrode according to any one of [B1] to [B11], wherein the positive electrode active material layer has a volume density of 2.10 to 2.50 g/cm3, preferably 2.15 to 2.45 g/cm3, more preferably 2.20 to 2.35 g/cm3.

[B13] The positive electrode according to any one of [B1] to [B12], wherein a current collector coating layer is present on a surface of the positive electrode current collector on a side of the positive electrode active material layer.

[B14] A non-aqueous electrolyte secondary battery, including the positive electrode of any one of [B1] to [B13], a negative electrode, and a non-aqueous electrolyte disposed between the positive electrode and the negative electrode.

[B15] A battery module or battery system including a plurality of the non-aqueous electrolyte secondary batteries of [B14].

Advantageous Effects of Invention

The present invention can provide a positive electrode for a non-aqueous electrolyte secondary battery, which can improve the performance of a non-aqueous electrolyte secondary battery in respect of high-rate cycling performance.

DESCRIPTION OF EMBODIMENTS

In the present specification and claims, "to" indicating a numerical range means that the numerical values described before and after "to" are included as the lower limit and the upper limit of the range.

Figure 1:
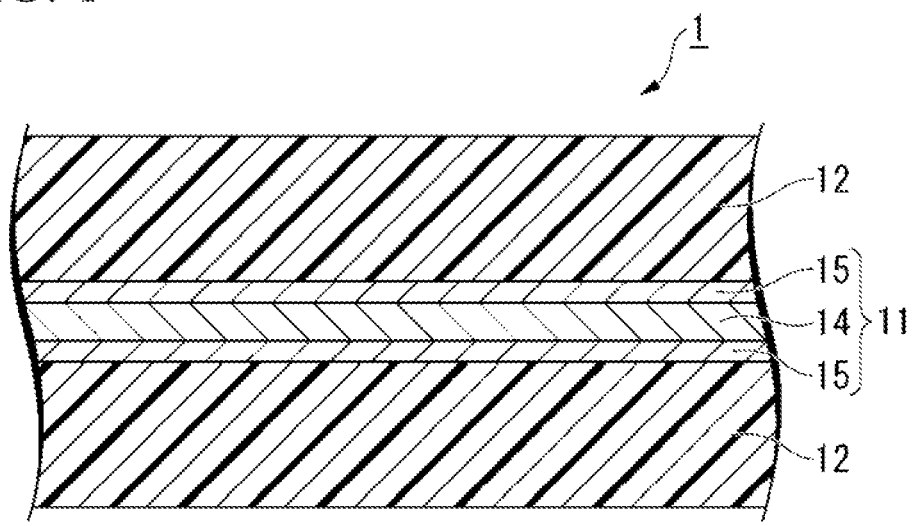
FIG. 1 is a cross-sectional view schematically showing an example of a positive electrode for a non-aqueous electrolyte secondary battery according to the present invention.
Figure 2:
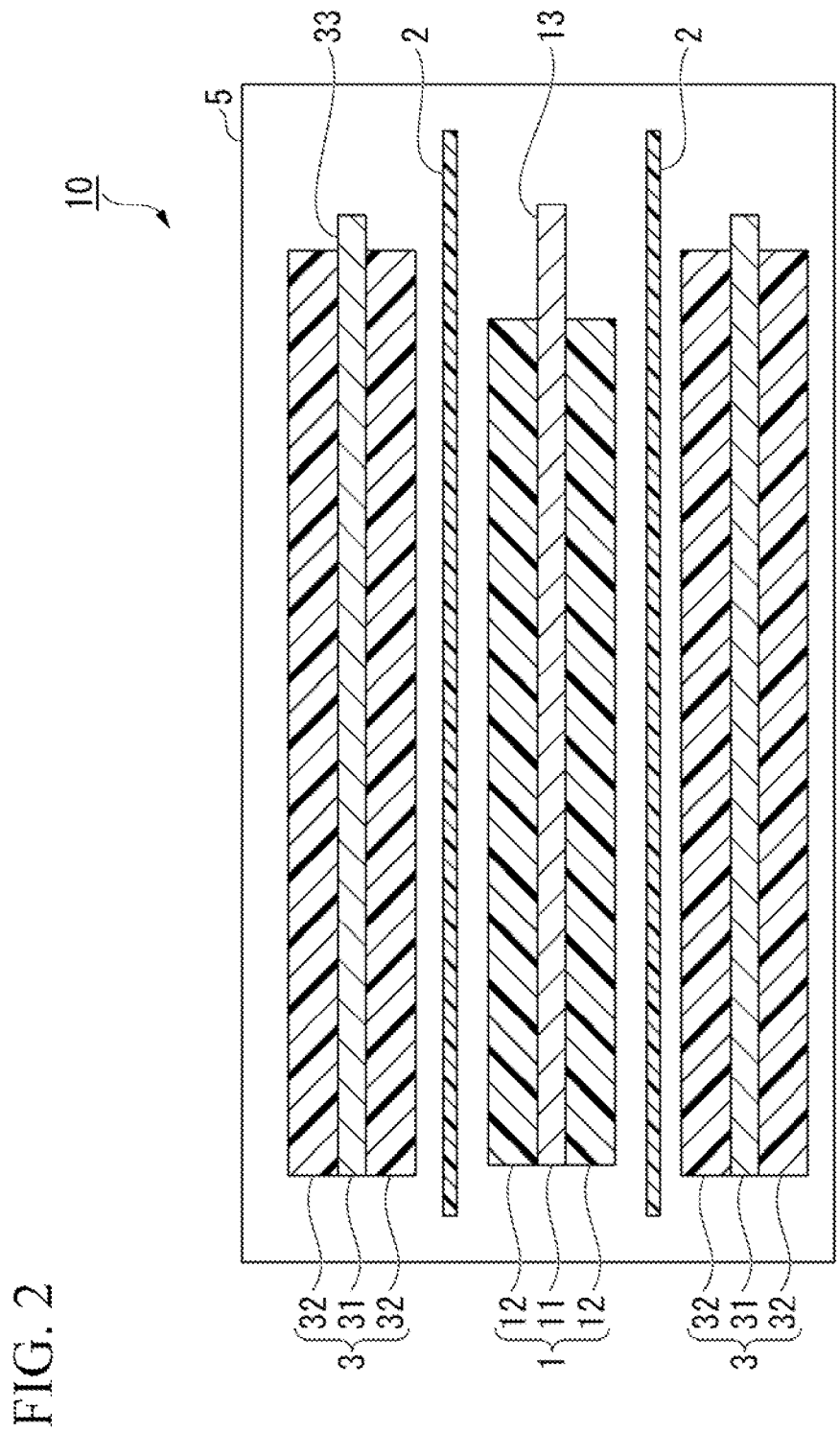
FIG. 2 is a cross-sectional view schematically showing an example of a non-aqueous electrolyte secondary battery according to the present invention.

FIG. 1 is a schematic cross-sectional view showing one embodiment of the positive electrode of the present invention for a non-aqueous electrolyte secondary battery, and FIG. 2 is a schematic cross-sectional view showing one embodiment of the non-aqueous electrolyte secondary battery of the present invention.

FIG. 1 and FIG. 2 are schematic diagrams for facilitating the understanding of the configurations, and the dimensional ratios and the like of each component do not necessarily represent the actual ones.

<Positive Electrode for Non-Aqueous Electrolyte Secondary Battery>

In the present embodiment, the positive electrode for a non-aqueous electrolyte secondary battery (also simply referred to as "positive electrode") 1 has a positive electrode current collector 11 and a positive electrode active material layer 12.

The positive electrode active material layer 12 is present on at least one surface of the positive electrode current collector 11. The positive electrode active material layers 12 may be present on both sides of the positive electrode current collector 11.

In the example shown in FIG. 1, the positive electrode current collector 11 has a positive electrode current collector main body 14 and current collector coating layers 15 that cover the positive electrode current collector main body 14 on its surfaces facing the positive electrode active material layers 12. The positive electrode current collector main body 14 alone may be used as the positive electrode current collector 11.

First Embodiment

In the first embodiment of the present invention, the positive electrode 1 for a non-aqueous electrolyte secondary battery includes a positive electrode current collector 11 and a positive electrode active material layer 12 provided on the positive electrode current collector 11, wherein:

the positive electrode active material layer 12 includes a positive electrode active material; and an integrated value (a) is 3 to 15%, which is an integrated value of frequency of particle diameters of 1 µm or less, and a frequency (b) is 8 to 20%, which is a frequency of a diameter with a maximum frequency, each determined from a volume-based particle size distribution curve of particles present in the positive electrode active material layer 12.

The positive electrode 1 having the above configuration can improve the performance of a non-aqueous electrolyte secondary battery in respect of high-rate cycling performance at high temperatures.

Specific descriptions are given below.

(Positive Electrode Active Material Layer)

The positive electrode active material layer 12 includes a positive electrode active material. The positive electrode active material layer 12 preferably further includes a binder. The positive electrode active material layer 12 may further include a conducting agent. In the context of the present specification, the term "conducting agent" refers to a conductive material of a particulate shape, a fibrous shape, etc., which is mixed with the positive electrode active material for the preparation of the positive electrode active material layer or formed in the positive electrode active material layer, and is caused to be present in the positive electrode active material layer in a form connecting the particles of the positive electrode active material.

The shape of the positive electrode active material is preferably particulate.

The amount of the positive electrode active material is preferably 80.0 to 99.9% by mass, and more preferably 90 to 99.5% by mass, based on the total mass of the positive electrode active material layer 12.

The positive electrode active material preferably has, on at least a part of its surface, a coated section including a conductive material (hereinbelow, the positive electrode active material particles having such a coated section are also referred to as "coated particles").

In this context, the expression "at least a part of its surface" means that the coated section of the active material particles covers 50% or more, preferably 70% or more, more preferably 90% or more, particularly preferably 100% of the total area of the entire outer surfaces of the positive electrode active material particles. This ratio (%) of the coated section (hereinafter, also referred to as "coverage") is an average value for all the positive electrode active material particles present in the positive electrode active material layer. As long as this average value is not less than the above lower limit value, the positive electrode active material layer may contain a small amount of positive electrode active material particles without the coated section. When the positive electrode active material particles without the coated section are present in the positive electrode active material layer, the amount thereof is preferably 30% by mass or less, more preferably 20% by mass or less, and particularly preferably 10% by mass or less, with respect to the total mass of the positive electrode active material particles present in the positive electrode active material layer.

The coverage can be measured by a method as follows. First, the particles in the positive electrode active material layer are analyzed by the energy dispersive X-ray spectroscopy using a transmission electron microscope (TEM-EDX). Specifically, an elemental analysis is performed by EDX with respect to the outer peripheral portion of the positive electrode active material particles in a TEM image. The elemental analysis is performed on carbon to identify the carbon covering the positive electrode active material particles. A section with a carbon coating having a thickness of 1 nm or more is defined as a coated section, and the ratio of the coated section to the entire circumference of the observed positive electrode active material particle can be determined as the coverage. The measurement can be performed with respect to, for example, 10 positive electrode active material particles, and an average value thereof can be used as a value of the coverage.

Further, the coated section of the active material is a layer directly formed on the surface of particles (hereinafter, also referred to as "core section") composed of only the positive electrode active material, which has a thickness of 1 nm to 100 nm, preferably 5 nm to 50 nm. This thickness can be determined by the above-mentioned TEM-EDX used for the measurement of the coverage.

The conductive material of the coated section of the active material preferably contains carbon. The conductive material may be composed only of carbon, or may be a conductive organic compound containing carbon and elements other than carbon. Examples of the other elements include nitrogen, hydrogen, oxygen and the like. In the conductive organic compound, the amount of the other elements is preferably 10 atomic % or less, and more preferably 5 atomic % or less.

It is more preferable that the conductive material in the coated section of the active material is composed only of carbon.

The amount of the conductive material is 0.1 to 3.0% by mass, more preferably 0.5 to 1.5% by mass, and even more preferably 0.7 to 1.3% by mass, based on the total mass of the positive electrode active material including the coated section. Excessive amount of the conductive material is not favorable in that the conductive material may come off the surface of the positive electrode active material particles and remain as isolated conducting agent particles.

For example, the coated section of the active material is formed in advance on the surface of the positive electrode active material particles, and is present on the surface of the positive electrode active material particles in the positive electrode active material layer. That is, the coated section of the active material in the present embodiment is not one newly formed in the steps following the preparation step of a positive electrode composition. In addition, the coated section of the active material is not one that comes off in the steps following the preparation step of a positive electrode composition.

For example, the coated section stays on the surface of the positive electrode active material even when the coated particles are mixed with a solvent by a mixer or the like during the preparation of a positive electrode composition. Further, the coated section stays on the surface of the positive electrode active material even when the positive electrode active material layer is detached from the positive electrode and then put into a solvent to dissolve the binder contained in the positive electrode active material layer in the solvent. Furthermore, the coated section stays on the surface of the positive electrode active material even when an operation to disintegrate agglomerated particles is implemented for measuring the particle size distribution of the particles in the positive electrode active material layer by the laser diffraction scattering method.

Examples of the method for producing the coated particles include a sintering method and a vapor deposition method.

Examples of the sintering method include a method that sinters an active material composition (for example, a slurry) containing the positive electrode active material particles and an organic substance at 500 to 1000° C. for 1 to 100 hours under atmospheric pressure. Examples of the organic substance added to the active material composition include salicylic acid, catechol, hydroquinone, resorcinol, pyrogallol, flu-oroglucinol, hexahydoxybenzene, benzoic acid, phthalic acid, terephthalic acid, phenylalanine, water dispersible phenolic resins, saccharides (e.g., sucrose, glucose and lactose), carboxylic acids (e.g., malic acid and citric acid), unsaturated monohydric alcohols (e.g., allyl alcohol and propargyl alcohol), ascorbic acid, and polyvinyl alcohol. This sintering method sinters an active material composition to allow carbon in the organic material to be fused to the surface of the positive electrode active material to thereby form the coated section of the active material.

Another example of the sintering method is the so-called impact sintering coaming method.

The impact sintering coating method is, for example, carried our as follows. In an impact sintering coating device, a burner is ignited using a mixed gas of a hydrocarbon and oxygen as a fuel to burn the mixed gas in a combustion chamber, thereby generating a flame, wherein the amount of oxygen is adjusted so as not to exceed its equivalent amount that allows complete combustion of the fuel, to thereby lower the flame temperature. A powder supply nozzle is installed downstream thereof, from which a solid-liquid-gas three-phase mixture containing a combustion gas as well as a slurry formed by dissolving an organic substance for coating in a solvent is injected toward the flame. The injected fine powder is accelerated at a temperature not higher than the transformation temperature, the sublimation temperature, and the evaporation temperature of the powder material by increasing the amount of combustion gas maintained at room temperature to lower the temperature of the injected fine powder. This allows the particles of the powder to be instantly fused on the active material by impact, thereby forming coated particles of the positive electrode active material.

Examples of the vapor deposition method include a vapor phase deposition method such as a physical vapor deposition method (PVD) and a chemical vapor deposition method (CVD), and a liquid phase deposition method such as plating.

Further, the thickness of the positive electrode active material layer (total thickness of the positive electrode active material layers in the case where the positive electrode active material layers are formed on both sides of the positive electrode current collector) is preferably 30 to 500 µm, more preferably 40 to 400 µm, particularly preferably 50 to 300 µm. When the thickness of the positive electrode active material layer is not less than the lower limit value of the above range, it is possible to provide a positive electrode that can be used for manufacturing a battery having excellent energy density per unit volume. When the thickness is not more than the upper limit value of the above range, the peel strength of the positive electrode active material layer can be improved, thereby preventing delamination of the positive electrode active material layer during charging/discharging.

The positive electrode active material preferably contains a compound having an olivine crystal structure.

The compound having an olivine crystal structure is preferably a compound represented by the following formula: $LiFe_xM_{(1-x)}PO_4$ (hereinafter, also referred to as "formula (I)"). In the formula (I), $0 \le x \le 1$. M is Co, Ni, Mn, Al, Ti or Zr. A minute amount of Fe and M (Co, Ni, Mn, Al, Ti or Zr) may be replaced with another element so long as the replacement does not affect the physical properties of the compound. The presence of a trace amount of metal impurities in the compound represented by the formula (I) does not impair the effect of the present invention.

The compound represented by the formula (I) is preferably lithium iron phosphate represented by $LiFePO_4$ (hereinafter, also simply referred to as "lithium iron phosphate"). The compound is more preferably lithium iron phosphate particles having, on at least a part of their surfaces, a coated section including a conductive material (hereinafter, also referred to as "coated lithium iron phosphate particles"). It is more preferable that the entire surfaces of lithium iron phosphate particles are coated with a conductive material for achieving more excellent battery capacity and cycling performance.

The coated lithium iron phosphate particles can be produced by a known method.

For example, the coated lithium iron phosphate particles can be obtained by a method in which a lithium iron phosphate powder is prepared by following the procedure described in Japanese Patent No. 5098146, and at least a part of the surface of lithium iron phosphate particles in the powder is coated with carbon by following the procedure described in GS Yuasa Technical Report, June 2008, Vol. 5, No. 1, pp. 27-31 and the like.

Specifically, first, iron oxalate dihydrate, ammonium dihydrogen phosphate, and lithium carbonate are weighed to give a specific molar ratio, and these are pulverized and mixed in an inert atmosphere. Next, the obtained mixture is heat-treated in a nitrogen atmosphere to prepare a lithium iron phosphate powder. Then, the lithium iron phosphate powder is placed in a rotary kiln and heat-treated while supplying methanol vapor with nitrogen as a carrier gas to obtain a powder of lithium iron phosphate particles having at least a part of their surfaces coated with carbon.

For example, the particle size of the lithium iron phosphate powder can be adjusted by optimizing the pulverization time in the pulverization process. The amount of carbon coating the particles of the lithium iron phosphate powder can be adjusted by optimizing the heating time and temperature in the step of implementing heat treatment while supplying methanol vapor. It is desirable to remove the carbon particles not consumed for coating by subsequent steps such as classification and washing.

The positive electrode active material may contain other positive electrode active materials than the compound having an olivine type crystal structure.

Preferable examples of the other positive electrode active materials include a lithium transition metal composite oxide. Specific examples thereof include lithium cobalt oxide ($LiCoO_2$), lithium nickel oxide ($LiNiO_2$), lithium nickel cobalt aluminum oxide ($LiNi_xCo_yAl_zO_2$ with the proviso that $x+y+z=1$), lithium nickel cobalt manganese oxide ($LiNi_xCo_yMn_zO_2$ with the proviso that $x+y+z=1$), lithium manganese oxide ($LiMn_2O_4$), lithium manganese cobalt oxide ($LiMnCoO_4$), lithium manganese chromium oxide ($LiMnCrO_4$), lithium vanadium nickel oxide ($LiNiVO_4$), nickel-substituted lithium manganese oxide (e.g., $LiMn_{1.5}Ni_{0.5}O_4$), and lithium vanadium cobalt oxide ($LiCoVO_4$), as well as nonstoichiometric compounds formed by partially substituting the compounds listed above with metal elements. Examples of the metal element include one or more selected from the group consisting of Mn, Mg, Ni, Co, Cu, Zn and Ge.

With respect to the other positive electrode active materials, a single type thereof may be used individually or two or more types thereof may be used in combination.

The other positive electrode active material may have, on at least a part of its surface, the coated section described above.

The amount of the compound having an olivine type crystal structure is preferably 50% by mass or more, preferably 80% by mass or more, and even more preferably 90% by mass or more, based on the total mass of the positive electrode active material (including the mass of the coated section if present). This amount may be 100% by mass.

When the coated lithium iron phosphate particles are used, the amount of the coated lithium iron phosphate particles is preferably 50% by mass or more, more preferably 80% by mass or more, and even more preferably 90% by mass or more, based on the total mass of the positive electrode active material. This amount may be 100% by mass.

The average particle size of the positive electrode active material particles (that is, positive electrode active material powder) (including the thickness of the coated section if present) is, for example, preferably 0.1 to 20.0 μm, and more preferably 0.2 to 10.0 μm. When two or more types of positive electrode active materials are used, the average particle size of each of such positive electrode active materials may be within the above range.

The average particle size of the positive electrode active material in the present specification is a volume-based median particle size measured using a laser diffraction/scattering particle size distribution analyzer.

The binder that can be contained in the positive electrode active material layer 12 is an organic substance, and examples thereof include polyacrylic acid, lithium polyacrylate, polyvinylidene fluoride, polyvinylidene fluoride-hexafluoropropylene copolymers, styrene butadiene rubbers, polyvinyl alcohol, polyvinyl acetal, polyethylene oxide, polyethylene glycol, carboxymethyl cellulose, polyacrylic nitrile, and polyimide. With respect to the binder, a single type thereof may be used alone or two or more types thereof may be used in combination.

The amount of the binder in the positive electrode active material layer 12 is, for example, preferably 4.0% by mass or less, and more preferably 2.0% by mass or less, based on the total mass of the positive electrode active material layer 12. When the amount of the binder is not more than the above upper limit value, the proportion of the substance that does not contribute to the conduction of lithium ions in the positive electrode active material layer 12 is reduced, and the battery performance can be further improved.

When the positive electrode active material layer 12 contains a binder, the lower limit of the amount of the binder is preferably 0.1% by mass or more, and more preferably 0.5% by mass or more, based on the total mass of the positive electrode active material layer 12.

That is, when the positive electrode active material layer 12 contains a binder, the amount of the binder is preferably 0.1% by mass to 4.0% by mass, and more preferably 0.5 to 2.0% by mass, based on a total mass of the positive electrode active material layer 12.

Examples of the conducting agent contained in the positive electrode active material layer 12 include carbon materials such as graphite, graphene, hard carbon, Ketjen black, acetylene black, and carbon nanotube (CNT). With respect to the conducting agent, a single type thereof may be used alone or two or more types thereof may be used in combination.

The amount of the conducting agent in the positive electrode active material layer 12 is, for example, preferably 4 parts by mass or less, more preferably 3 parts by mass or less, and even more preferably 1 part by mass or less, relative to 100 parts by mass of the positive electrode active material.

When the conducting agent is incorporated into the positive electrode active material layer 12, the lower limit value of the amount of the conducting agent is appropriately determined according to the type of the conducting agent, and is, for example, more than 0.1% by mass, based on the total mass of the positive electrode active material layer 12.

In the context of the present specification, the expression "the positive electrode active material layer 12 does not contain a conducting agent" or similar expression means that the positive electrode active material layer 12 does not substantially contain a conducting agent, and should not be construed as excluding a case where a conducting agent is contained in such an amount that the effects of the present invention are not affected. For example, if the amount of the conducting agent is 0.1% by mass or less, based on the total mass of the positive electrode active material layer 12, then, it is judged that substantially no conducting agent is contained.

(Positive Electrode Current Collector)

Examples of the material of the positive electrode current collector main body 14 include conductive metals such as copper, aluminum, titanium, nickel, and stainless steel.

The thickness of the positive electrode current collector main body 14 is preferably, for example, 8 to 40 un, and more preferably 10 to 25 µm.

The thickness of the positive electrode current collector main body 14 and the thickness of the positive electrode current collector 11 can be measured using a micrometer. One example of the measuring instrument usable for this purpose is an instrument with the product name "MDH-25M", manufactured by Mitutoyo Co., Ltd.

(Current Collector Coating Layer)

The current collector coating layer 15 contains a conductive material.

The conductive material in the current collector coating layer 15 preferably contains carbon (conductive carbon), and more preferably consists exclusively of carbon.

The current collector coating layer 15 is preferred to be, for example, a coating layer containing carbon particles such as carbon black and a binder. Examples of the binder for the current collector coating layer 15 include those listed above as examples of the binder for the positive electrode active material layer 12.

With regard to the production of the positive electrode current collector 11 in which the surface of the positive electrode current collector main body 14 is coated with the current collector coating layer 15, for example, the production can be implemented by a method in which a slurry containing the conductive material, the binder, and a solvent is applied to the surface of the positive electrode current collector main body 14 with a known coating method such as a gravure method, followed by drying to remove the solvent.

The thickness of the current collector coating layer 15 is preferably 0.1 to 4.0 µm.

The thickness of the current collector coating layer can be measured by a method of measuring the thickness of the coating layer in a transmission electron microscope (TEM) image or a scanning electron microscope (SEM) image of a cross section of the current collector coating layer. The thickness of the current collector coating layer need not be uniform. It is preferable that the current collector coating layer 15 having a thickness of 0.1 µm or more is present on at least a part of the surface of the positive electrode current collector main body 14, and the maximum thickness of the current collector coating layer is 4.0 µm or less.

(Method for Producing Positive Electrode)

For example, the positive electrode 1 of the present embodiment can be produced by a method in which a positive electrode composition containing a positive electrode active material, a binder and a solvent is coated on the positive electrode current collector 11, followed by drying to remove the solvent to thereby form a positive electrode active material layer 12. The positive electrode composition may contain a conducting agent.

The thickness of the positive electrode active material layer 12 can be adjusted by a method in which a layered body composed of the positive electrode current collector 11 and the positive electrode active material layer 12 formed thereon is placed between two flat plate jigs and, then, uniformly pressurized in the thickness direction of this layered body. For this purpose, for example, a method of pressurizing (rolling) using a roll press can be used.

The solvent for the positive electrode composition is preferably a non-aqueous solvent. Examples of the solvent include alcohols such as methanol, ethanol, 1-propanol and 2-propanol; chain or cyclic amides such as N-methylpyrrolidone and N,N-dimethylformamide; and ketones such as acetone. With respect to these solvents, a single type thereof may be used individually or two or more types thereof may be used in combination.

(Particle Size Distribution Curve)

In the present specification, the particle size distribution curve of the particles present in the positive electrode active material layer 12 (hereinafter, also referred to as "particle size distribution curve P") is a volume-based particle size distribution curve obtained by measurement using a laser diffraction/scattering particle size distribution analyzer.

The particle size distribution curve P may be shown as a frequency distribution curve in which particle diameters are plotted on the abscissa, and frequency values (unit: %) are plotted on the ordinate, or an integrated distribution curve in which particle diameters are plotted on the abscissa, and integrated values of the frequency (unit: %) are plotted on the ordinate.

A sample used for the measurement is an aqueous dispersion prepared by detaching the positive electrode active material layer 12 from the positive electrode 1 and dispersing the particles that had been present in the positive electrode active material layer 12 in water. It is preferable to ultrasonically treat the aqueous dispersion to sufficiently disperse the particles.

In the positive electrode 1 of the present embodiment, an integrated value (a) is 3 to 15%, which is an integrated value of frequency of particle diameters of 11 µm or less, and a frequency (b) is 8 to 20%, which is a frequency of a diameter with a maximum frequency (mode diameter), each determined from the particle size distribution curve P.

The integrated value (a) is preferably 4 to 12%, and more preferably 5 to 10%.

The frequency (b) is preferably 9 to 18%, and more preferably 11 to 15%.

A smaller integrated value (a) means a smaller ratio of the volume occupied by the fine powder relative to the total volume of the particles present in the positive electrode active material layer 12. The fine powders of the positive electrode active material and the conducting agent have large surface areas, and hence show relatively high reactivity. As a result, such fine powders are liable to form sites where side reactions between the positive electrode 1 and the electrolytic solution vigorously occur due to local current concentration during the high-rate charge/discharge cycle. When the integrated value (a) is not more than the upper limit of the above range, sites of side reactions decrease and deterioration is likely to be suppressed.

When the integrated value (a) is not less than the lower limit of the above range, particles with a particle diameter of 1 μm or less fill the voids between the particles, and hence the volume density of the positive electrode tends to improve, which is preferable in terms of improving the volumetric energy density of the battery.

A high frequency (b) means the presence of a relatively small amount of fine particles and coarse particles. As described above, the fine powders of the positive electrode active material and the conducting agent are liable to cause deterioration. Coarse particles of the positive electrode active material and the conducting agent tend to result in formation of inactive sites on their surfaces that do not contribute to the reaction during charging and discharging, which tends to cause a decrease in capacity.

When the ratio of the positive electrode active material in the positive electrode active material layer 12 is large and the amount of fine powder is small, or when the particle size distributions of the positive electrode active material and the conducting agent are similar and show large overlap of the peaks, the frequency (b) tends to increase. As the frequency (b) increases, the number of particles having a particle diameter close to the mode diameter increases, so that the amount of fine particles decreases relatively and deterioration is likely to be suppressed.

When the frequency (b) is not less than the lower limit of the above range, the abundance ratio of the fine particles and coarse particles decreases relatively, and an effect of avoiding local current concentration during a high rate charge/discharge cycle can be obtained. When the frequency (b) is not more than the upper limit of the above range, a distribution with moderate amounts of small particles and large particles can be obtained, and the small particles fill the gaps between the large particles during the rolling, so that the volume density of the positive electrode is likely to improve, which is favorable in terms of improving the volumetric energy density of the battery.

The integrated value (a) can be adjusted by, for example, the amount of fine powder contained in the positive electrode active material. The integrated value (a) can be lowered by using a positive electrode active material with less amount of fine powder. When a conducting agent is used, the integrated value (a) can be controlled by adjusting the blending amount of the conducting agent. The integrated value (a) can be lowered by reducing the blending amount of the conducting agent.

The frequency (b) can be controlled, for example, by adjusting the particle size distribution of the positive electrode active material. As the half width of the peak in the frequency distribution curve of the positive electrode active material decreases, the frequency (b) tends to increase. When a conducting agent is used, the frequency (b) can be controlled by adjusting the particle size distribution of the conducting agent and the blending amount of the conducting agent. As the similarity of the particle size distribution of the conducting agent to the particle size distribution of the positive electrode active material increases, the frequency (b) tends to increase. When the particle size distribution curve of the conducting agent is off to the side of smaller particles or to the side of larger particles relative to the particle size distribution curve of the positive electrode active material, the frequency (b) can be increased by reducing the blending amount of the conducting agent as much as possible.

When the frequency values are plotted on the ordinate of the particle size distribution curve P, the particle size distribution curve P preferably has a single maximum point (peak), indicating a monomodal particle size distribution. When the particle size distribution curve P has a single maximum point, excellent cycling performance can be achieved. For example, a particle size distribution curve P having a single maximum point can be obtained when the positive electrode active material layer 12 is formed by using a single type of a positive electrode active material and without using a conducting agent or using a least possible amount of a conducting agent.

Of the two normal distributions obtained by waveform separation of the particle size distribution curve P with frequency as ordinate, the one with a smaller average size is defined as first normal distribution, and the one with a larger average size is defined as a second normal distribution. In the obtained first normal distribution, the particle size at a 10% frequency cumulation from a smaller particle side is defined as 10% particle size (D 10), and the panicle size at a 90% frequency cumulation from a smaller particle side is defined as 90% particle size (D90).

The positive electrode 1 of the present embodiment preferably has a distribution width (c) ((c)=D90–D10) of 2.0 to 20.0 μm, which is obtained by subtracting the 10% particle size from the 90% particle size (c=D90–D10).

The distribution width (c) is a value reflecting a situation where the frequency distributions of the fine powder z1 of the positive electrode active material present in the positive electrode active material layer 12, the positive electrode active material z2 having a particle size smaller than the most frequent diameter (mode diameter) in the particle size distribution curve P. and the conducting agent z3 having a particle size smaller than the most frequent diameter of the particle size distribution curve P are combined. When the distribution width (c) is not less than the lower limit of the above range and the integrated value (d) described below is 30% or less, the amounts of the z1, z2, and z3 with particle diameters around 1 μm are small.

The distribution width (c) being not more than the upper limit indicates that the particles of the positive electrode active material and the conducting agent present in the positive electrode active material layer are not too large. If these particles are too large, the surface area where a reaction can occur during charging and discharging of the positive electrode active material layer is reduced. When the distribution width (c) exceeds 20.0 μm, the effect of the present invention will be lost. In this context, the particles being "large" indicates that the proportion of coarse particles is high and/or the most frequent diameter is large.

The distribution width (c) is preferably 2.0 to 15.0 μm, and more preferably 2.5 to 10.0 μm. The distribution width (c) can be controlled, for example, by adjusting the particle size distribution of the positive electrode active material. As the proportions of z1 and z2 decrease, the distribution width (c) is likely to increase. When the conducting agent is used, the distribution width (c) can be controlled by adjusting the blending amount and the particle size of z3. As the amount of z3 decreases and as the particle size of z3 gets closer to the most frequent diameter of the particle size distribution curve P, the distribution width (c) is inclined to decrease.

When the particles of the positive electrode active material and the conducting agent are too large, the distribution width (c) increases.

The positive electrode 1 of the present embodiment preferably has an integrated value (d) of 1 to 30%, which is an integrated value of frequency of particle diameters of 11 µm or less in the first normal distribution.

The integrated value (d) reflects the distribution of the fine powder z1 of the positive electrode active material and the conducting agent z4 having a particle diameter of 1 µm or less. When the integrated value (d) is not less than the lower limit of the above range, particles with a particle diameter of 1 µm or less fill the voids between the particles during rolling, and hence the volume density of the positive electrode tends to improve, which is preferable in terms of improving the volumetric energy density of the battery.

When the integrated value (d) is not more than the upper limit of the above range, the amount of fine powder on which the current locally concentrates during charging/discharging is reduced, so that deterioration is likely to be suppressed.

The integrated value (d) is preferably 4 to 27%, and more preferably 7 to 24%.

The integrated value (d) can be controlled, for example, by adjusting the amount of fine particles having a particle diameter of 1 µm or less in the positive electrode active material. As the amount of fine powder of 1 µm or less decreases, the integrated value (d) tends to decrease. The amount of fine powder can be reduced by a known treatment method such as classification implemented at the time of producing the positive electrode active material.

When the conducting agent is used, the integrated value (d) can be controlled by adjusting the particle size and the blending amount of the conducting agent. As the proportion of particles having a particle diameter of 1 µm or less in the conducting agent decreases, the integrated value (d) tends to decrease. As the amount of the conducting agent having a particle diameter of 1 µm or less in the positive electrode active material layer 12 decreases, the integrated value (d) tends to decrease.

(Volume Density of Positive Electrode Active Material Layer)

In the present embodiment, the volume density of the positive electrode active material layer 12 is preferably 2.05 to 2.80 g/cm$^3$, more preferably 2.15 to 2.50 g/cm$^3$.

The volume density of the positive electrode active material layer 12 can be measured by, for example, the following measuring method.

The thicknesses of the positive electrode 1 and the positive electrode current collector 11 are each measured with a micrometer, and the difference between these two thickness values is calculated as the thickness of the positive electrode active material layer 12. With respect to the thickness of the positive electrode 1 and the thickness of the positive electrode current collector 11, each of these thickness values is an average value of the thickness values measured at five or more arbitrarily chosen points. The thickness of the positive electrode current collector 11 may be measured at the exposed section 13 of the positive electrode current collector, which is described below.

The mass of the measurement sample punched out from the positive electrode so as to have a predetermined area is measured, from which the mass of the positive electrode current collector 11 measured in advance is subtracted to calculate the mass of the positive electrode active material layer 12.

The volume density of the positive electrode active material layer 12 is calculated by the following formula (1).

Volume density (unit: g/cm$^3$)=mass of positive electrode active material layer (unit: g)/[(thickness of positive electrode active material layer (unit: cm))×area of measurement sample (Unit: cm$^2$)]    (1)

When the volume density of the positive electrode active material layer 12 is within the above range, the volumetric energy density of the battery can be further improved, and a non-aqueous electrolyte secondary battery with a further improved cycle characteristics can be realized.

The volume density of the positive electrode active material layer 12 can be controlled by, for example, adjusting the amount of the positive electrode active material, the particle size of the positive electrode active material, the thickness of the positive electrode active material layer 12, and the like. When the positive electrode active material layer 12 contains a conducting agent, the volume density can also be controlled by selecting the type of the conducting agent (specific surface area, specific gravity), or adjusting the amount of the conducting agent, and the particle size of the conducting agent.

The positive electrode 1 of the present embodiment preferably has a conductive carbon content of 0.5 to 3.5% by mass, more preferably 1.5 to 3.0% by mass, with respect to the mass of the positive electrode 1 excluding the positive electrode current collector main body 14.

When the positive electrode 1 is composed of the positive electrode current collector main body 14 and the positive electrode active material layer 12, the mass of the positive electrode 1 excluding the positive electrode current collector main body 14 is the mass of the positive electrode active material layer 12.

When the positive electrode 1 is composed of the positive electrode current collector main body 14, the current collector coating layer 15, and the positive electrode active material layer 12, the mass of the positive electrode 1 excluding the positive electrode current collector main body 14 is the sum of the mass of the current collector coating layer 15 and the mass of the positive electrode active material layer 12.

The conductive carbon content based on the total mass of the positive electrode active material layer is preferably 0.5% by mass or more and less than 3.0% by mass, more preferably 1.0 to 2.8% by mass, even more preferably 1.3 to 2.6% by mass.

The amount of the conductive carbon with respect to the mass of the positive electrode 1 excluding the positive electrode current collector main body 14 can be measured by <<Method for measuring conductive carbon content>> described below with respect to a dried product (powder), as a measurement target, obtained by detaching the whole of a layer present on the positive electrode current collector main body 14, collecting the whole of substance resulting from the detached layer, and vacuum-drying the collected substance at 120° C. The particle size of the dried powder as the measurement target is not particularly limited as long as the conductive carbon content can be appropriately measured by the method described below.

The conductive carbon content based the total mass of the positive electrode active material layer can be measured by <<Method for measuring conductive carbon content>> described below with respect to a dried product (powder), as a measurement target, obtained by vacuum-drying, at 120° C., the positive electrode active material layer detached from the positive electrode.

The conductive carbon to be measured by the <<Method for measuring conductive carbon content>> described below includes carbon in the coated section of the positive electrode active material, carbon in the conducting agent, and carbon in the current collector coating layer 15. Carbon in the binder is not included in the conductive carbon to be measured.

As a method for obtaining the measurement target, for example, the following method can be adopted.

First, the layer (powder) present on the positive electrode current collector main body 14 is completely detached by a method in which the positive electrode 1 is punched to obtain a piece having a predetermined size, and the piece of the positive electrode current collector main body 14 is immersed in a solvent (for example, N-methylpyrrolidone) and stirred. Next, after confirming that no powder remains attached to the positive electrode current collector main body 14, the positive electrode current collector main body 14 is taken out from the solvent to obtain a suspension (slurry) containing the detached powder and the solvent. The obtained suspension is dried at 120° C. to completely volatilize the solvent to obtain the desired measurement target (powder).

<<Method for Measuring Conductive Carbon Content>>

(Measurement Method A)

A sample having a weight w1 is taken from a homogeneously mixed product of the measurement target, and the sample is subjected to thermogravimetry differential thermal analysis (TG-DTA) implemented by following step A1 and step A2 defined below, to obtain a TG curve. From the obtained TG curve, the following first weight loss amount M1 (unit: % by mass) and second weight loss amount M2 (unit: % by mass) are obtained. By subtracting M1 from M2, the conductive carbon content (unit: % by mass) is obtained.

Step A1: A temperature of the sample is raised from 30° C. to 600° C. at a heating rate of 10° C./min and holding the temperature at 600° C. for 10 minutes in an argon gas stream of 300 mL/min to measure a resulting mass w2 of the sample, from which a first weight loss amount M1 is determined by formula (a1):

$$M1=(w1-w2)/w1\times 100 \qquad (a1).$$

Step A2: Immediately after the step A1, the temperature is lowered from 600° C. to 200° C. at a cooling rate of 10° C./min and held at 200° C. for 10 minutes, followed by completely substituting the argon gas stream with an oxygen gas stream. The temperature is raised from 200° C. to 1000° C. at a heating rate of 10° C./min and held at 1000° C. for 10 minutes in an oxygen gas stream of 100 mL/min to measure a resulting mass w3 of the sample, from which a second weight loss amount M2 (unit: % by mass) is calculated by formula (a2):

$$M2=(w1-w3)/w1\times 100 \qquad (a2).$$

(Measurement Method B)

0.0001 mg of a precisely weighed sample is taken from a homogeneously mixed product of the measurement target, and the sample is burnt under burning conditions defined below to measure an amount of generated carbon dioxide by a CHN elemental analyzer, from which a total carbon content M3 (unit: % by mass) of the sample is determined. Also, a first weight loss amount M1 is determined following the procedure of the step A1 of the measurement method A. By subtracting M1 from M3, the conductive carbon content (unit: % by mass) is obtained.

(Burning Conditions)

Temperature of combustion furnace: 1150° C.
Temperature of reduction furnace: 850° C.
Helium flow rate: 200 mL/min.
Oxygen flow rate: 25 to 30 mL/min.

(Measurement Method C)

The total carbon content M3 (unit: % by mass) of the sample is measured in the same manner as in the above measurement method B. Further, the carbon amount M4 (unit: % by mass) of carbon derived from the binder is determined by the following method. M4 is subtracted from M3 to determine a conductive carbon content (unit: % by mass).

When the binder is polyvinylidene fluoride (PVDF: monomer ($CH_2CF_2$), molecular weight 64), the conductive carbon content can be calculated by the following formula from the fluoride ion ($F^-$) content (unit: % by mass) measured by combustion ion chromatography based on the tube combustion method, the atomic weight (19) of fluorine in the monomers constituting PVDF, and the atomic weight (12) of carbon in the PVDF.

PVDF content (unit: % by mass)=fluoride ion content (unit: % by mass)×64/38

PVDF-derived carbon amount $M4$ (unit: % by mass)=fluoride ion content (unit: % by mass)×12/19

The presence of polyvinylidene fluoride as a binder can be verified by a method in which a sample or a liquid obtained by extracting a sample with an N,N-dimethylformamide (DMF) solvent is subjected to Fourier transform infrared spectroscopy (FT-IR) to confirm the absorption attributable to the C—F bond. Such verification can be also implemented by 19F-NMR measurement.

When the binder is identified as being other than PVDF, the carbon amount M4 attributable to the binder can be calculated by determining the amount (unit: % by mass) of the binder from the measured molecular weight, and the carbon content (unit: % by mass).

These methods are described in the following publications:

Toray Research Center, The TRC News No. 117 (September 2013), pp. 34-37, [Searched on Feb. 10, 2021], Internet <https://www.toray-research.co.jp/technical-info/trenews/pdf/TRC117(34-37).pdf>

TOSOH Analysis and Research Center Co., Ltd., Technical Report No. T1019 2017.09.20, [Searched on Feb. 10, 2021], Internet <http://www.tosoh-arc.co.jp/techrepo/files/tare00522/T1719N.pdf>

<<Analytical Method for Conductive Carbon>>

The conductive carbon in the coated section of the positive electrode active material and the conductive carbon as the conducting agent can be distinguished by the following analytical method.

For example, particles in the positive electrode active material layer are analyzed by a combination of transmission electron microscopy-electron energy loss spectroscopy (TEM-EELS), and particles having a carbon-derived peak around 290 eV only near the particle surface can be judged to be the positive electrode active material. On the other hand, particles having a carbon-derived peak inside the particles can be judged to be the conducting agent. In this context, "near the particle surface" means a region to the depth of approximately 100 nm from the particle surface, while "inside" means an inner region positioned deeper than the "near the particle surface".

As another method, the particles in the positive electrode active material layer are analyzed by Raman spectroscopy mapping, and particles showing carbon-derived G-band and D-band as well as a peak of the positive electrode active material-derived oxide crystals can be judged to be the positive electrode active material. On the other hand, particles showing only G-band and D-band can be judged to be the conducting agent.

As still another method, a cross section of the positive electrode active material layer is observed with scanning spread resistance microscope (SSRM). When the particle surface has a region with lower resistance than the inside of the particle, the region with lower resistance can be judged to be the conductive carbon present in the coated section of the active material. Other particles that are present isolatedly and have low resistance can be judged to be the conducting agent.

In this context, a trace amount of carbon considered to be an impurity and a trace amount of carbon unintentionally removed from the surface of the positive electrode active material during production are not judged to be the conducting agent.

Using any of these methods, it is possible to verify whether or not the conducting agent formed of carbon material is contained in the positive electrode active material layer.

<Non-Aqueous Electrolyte Secondary Battery>

The non-aqueous electrolyte secondary battery 10 of the present embodiment shown in FIG. 2 includes a positive electrode 1 of the present embodiment, a negative electrode 3, and a non-aqueous electrolyte. Further, a separator 2 may be provided. Reference numeral 5 in FIG. 1 denotes an outer casing.

In the present embodiment, the positive electrode 1 has a plate-shaped positive electrode current collector 11 and positive electrode active material layers 12 provided on both surfaces thereof. The positive electrode active material layer 12 is present on a part of each surface of the positive electrode current collector 11. The edge of the surface of the positive electrode current collector 11 is an exposed section 13 of the positive electrode current collector, which is free of the positive electrode active material layer 12. A terminal tab (not shown) is electrically connected to an arbitrary portion of the exposed section 13 of the positive electrode current collector.

The negative electrode 3 has a plate-shaped negative electrode current collector 31 and negative electrode active material layers 32 provided on both surfaces thereof. The negative electrode active material layer 32 is present on a part of each surface of the negative electrode current collector 31. The edge of the surface of the negative electrode current collector 31 is an exposed section 33 of the negative electrode current collector, which is free of the negative electrode active material layer 32. A terminal tab (not shown) is electrically connected to an arbitrary portion of the exposed section 33 of the negative electrode current collector.

The shapes of the positive electrode 1, the negative electrode 3 and the separator 2 are not particularly limited. For example, each of these may have a rectangular shape in a plan view.

With regard to the production of the non-aqueous electrolyte secondary battery 10 of the present embodiment, for example, the production can be implemented by a method in which the positive electrode 1 and the negative electrode 3 are alternately interleaved through the separator 2 to produce an electrode layered body, which is then packed into an outer casing such as an aluminum laminate bag, and a non-aqueous electrolyte (not shown) is injected into the outer casing, followed by sealing the outer casing. FIG. 2 shows a representative example of a structure of the battery in which the negative electrode, the separator, the positive electrode, the separator, and the negative electrode are stacked in this order, but the number of electrodes can be altered as appropriate. The number of the positive electrode 1 may be one or more, and any number of positive electrodes 1 can be used depending on a desired battery capacity. The number of each of the negative electrode 3 and the separator 2 is larger by one sheet than the number of the positive electrode 1, and these are stacked so that the negative electrode 3 is located at the outermost layer.

(Negative Electrode)

The negative electrode active material layer 32 includes a negative electrode active material. Further, the negative electrode active material layer 32 may further include a binder. Furthermore, the negative electrode active material layer 32 may include a conducting agent as well. The shape of the negative electrode active material is preferably particulate.

For example, the negative electrode 3 can be produced by a method in which a negative electrode composition containing a negative electrode active material, a binder and a solvent is prepared, and coated on the negative electrode current collector 31, followed by drying to remove the solvent to thereby form a negative electrode active material layer 32. The negative electrode composition may contain a conducting agent.

Examples of the negative electrode active material and the conducting agent include carbon materials such as graphite, graphene, hard carbon, Ketjen black, acetylene black, and carbon nanotube (CNT). With respect to each of the negative electrode active material and the conducting agent, a single type thereof may be used alone or two or more types thereof may be used in combination.

Examples of the material of the negative electrode current collector 31, the binder and the solvent in the negative electrode composition include those listed above as examples of the material of the positive electrode current collector 11, the binder and the solvent in the positive electrode composition. With respect to each of the binder and the solvent in the negative electrode composition, a single type thereof may be used alone or two or more types thereof may be used in combination.

The sum of the amount of the negative electrode active material and the amount of the conducting agent is preferably 80.0 to 99.9% by mass, and mom preferably 85.0 to 98.0% by mass, based on the total mass of the negative electrode active material layer 32.

(Separator)

The separator 2 is disposed between the negative electrode 3 and the positive electrode 1 to prevent a short circuit or the like. The separator 2 may retain a non-aqueous electrolyte described below.

The separator 2 is not particularly limited, and examples thereof include a porous polymer film, a non-woven fabric, and glass fiber.

An insulating layer may be provided on one or both surfaces of the separator 2. The insulating layer is preferably a layer having a porous structure in which insulating fine particles are bonded with a binder for an insulating layer.

The separator 2 may contain various plasticizers, antioxidants, and flame retardants.

Examples of the antioxidant include phenolic antioxidants such as hindered-phenolic antioxidants, monophenolic antioxidants, bisphenolic antioxidants, and polyphenolic antioxidants; hindered amine antioxidants; phosphorus antioxidants; sulfur antioxidants; benzotriazole antioxidants; benzophenone antioxidants; triazine antioxidants; and salicylate antioxidants. Among these, phenolic antioxidants and phosphorus antioxidants are preferable.

(Non-Aqueous Electrolyte)

The non-aqueous electrolyte fills the space between the positive electrode 1 and the negative electrode 3. For example, any of known non-aqueous electrolytes used in lithium ion secondary batteries, electric double layer capacitors and the like can be used.

As the non-aqueous electrolyte, a non-aqueous electrolyte solution in which an electrolyte salt is dissolved in an organic solvent is preferable.

The organic solvent is preferably one having tolerance to high voltage. Examples of the organic solvent include polar solvents such as ethylene carbonate, propylene carbonate, dimethyl carbonate, diethyl carbonate, ethyl methyl carbonate, γ-butyrolactone, sulfolane, dimethyl sulfoxide, acetonitrile, dimethylformamide, dimethylacetamide, 1,2-dimethoxyethane, 1,2-diethoxyethane, tetrahydrofuran, 2-methyltetrahydrofuran, dioxolane, and methyl acetate, as well as mixtures of two or more of these polar solvents.

The electrolyte salt is not particularly limited, and examples thereof include lithium-containing salts such as $LiClO_4$, $LiPF_6$, $LiBF_4$, $LiAsF_6$, $LiCF_6$, $LiCF_3CO_2$, $LiPF_6SO_3$, $LiN(SO_2F)_2$, $LiN(SO_2CF_3)_2$, $Li(SO2CF_2CF_3)_2$, $LiN(COCF_3)_2$, and $LiN(COCF_3CF_3)_2$, as well as mixture of two or more of these salts.

The non-aqueous electrolyte secondary battery of this embodiment can be used as a lithium ion secondary battery for various purposes such as industrial use, consumer use, automobile use, and residential use.

The application of the non-aqueous electrolyte secondary battery of this embodiment is not particularly limited. For example, the battery can be used in a battery module configured by connecting a plurality of non-aqueous electrolyte secondary batteries in series or in parallel, a battery system including a plurality of electrically connected battery modules and a battery control system, and the like.

Examples of the battery system include battery packs, stationary storage battery systems, automobile power storage battery systems, automobile auxiliary storage battery systems, emergency power storage battery systems, and the like.

Second Embodiment

In the second embodiment of the present invention, the positive electrode 1 for a non-aqueous electrolyte secondary battery includes a positive electrode current collector 11 and a positive electrode active material layer 12 provided on the positive electrode current collector 11, wherein:

the positive electrode active material layer 12 includes a positive electrode active material; and when two directions perpendicular to a thickness direction of the positive electrode current collector 11 and orthogonal to each other are defined as a first direction and a second direction, an average thickness a1, a maximum thickness b1 and a minimum thickness c1 in a thickness distribution in the first direction as well as a thickness d1 which is largest in terms of an absolute value of the difference from the average thickness a1 satisfy inequations 1 and 2:

$$0.990 \leq (d1/a1) \leq 1.010 \quad \text{Inequation 1, and}$$

$$(b1-c1) \leq 5.0 \text{ μm} \quad \text{Inequation 2, and}$$

an average thickness a2, a maximum thickness b2 and a minimum thickness c2 in a thickness distribution in the second direction as well as a thickness d2 which is largest in terms of an absolute value of the difference from the average thickness a2 satisfy inequations 3 and 4:

$$0.990 \leq (d2/a2) \leq 1.010 \quad \text{Inequation 3, and}$$

$$(b2-c2) \leq 5.0 \text{ μm} \quad \text{Inequation 4.}$$

The positive electrode 1 having the above configuration can improve the performance of a non-aqueous electrolyte secondary battery in respect of high-rate cycling performance.

More specific explanation is made below.

(Positive Electrode Active Material Layer)

The positive electrode active material layer 12 includes a positive electrode active material. The positive electrode active material layer 12 preferably further includes a binder. The positive electrode active material layer 12 may further include a conducting agent.

The shape of the positive electrode active material is preferably particulate.

The amount of the positive electrode active material is preferably 80.0 to 99.9% by mass, and more preferably 90 to 99.5% by mass, based on the total mass of the positive electrode active material layer 12.

The positive electrode active material preferably has, on at least a part of its surface, a coated section including a conductive material (hereinbelow, the positive electrode active material particles having such a coated section are also referred to as "coated particles").

In this context, the expression "at least a part of its surface" means that the coated section of the active material particles covers 50% or more, preferably 70% or more, more preferably 90% or more, particularly preferably 100% of the total area of the entire outer surfaces of the positive electrode active material particles. This coverage (%) is an average value for all the positive electrode active material particles present in the positive electrode active material layer. As long as this average value is not less than the above lower limit value, the positive electrode active material layer may contain positive electrode active material particles without the coated section. When the positive electrode active material particles without the coated section are present in the positive electrode active material layer, the amount thereof is preferably 30% by mass or less, more preferably 20% by mass or less, and particularly preferably 10% by mass or less, with respect to the total mass of the positive electrode active material particles present in the positive electrode active material layer.

The coverage can be measured by a method as follows. First, the particles in the positive electrode active material layer are analyzed by the energy dispersive X-ray spectroscopy (TEM-EDX) using a transmission electron microscope. Specifically, an elemental analysis is performed by EDX with respect to the outer peripheral portion of the positive electrode active material particles in a TEM image. The elemental analysis is performed on carbon to identify the carbon covering the positive electrode active material particles. A section with a carbon coating having a thickness of 1 nm or more is defined as a coated section, and the ratio of the coated section to the entire circumference of the observed positive electrode active material particle can be determined as the coverage. The measurement can be performed with respect to, for example, 10 positive electrode active material particles, and an average value thereof can be used as a value of the coverage.

Further, the coated section of the active material is a layer directly formed on the surface of particles (core section)

composed of only the positive electrode active material, which has a thickness of 1 nm to 100 nm, preferably 5 nm to 50 nm. This thickness can be determined by the above-mentioned TEM-EDX used for the measurement of the coverage.

The conductive material of the coated section of the active material preferably contains carbon. The conductive material may be composed only of carbon, or may be a conductive organic compound containing carbon and elements other than carbon. Examples of the other elements include nitrogen, hydrogen, oxygen and the like. In the conductive organic compound, the amount of the other elements is preferably 10 atomic % or less, and more preferably 5 atomic % or less.

It is more preferable that the conductive material in the coated section of the active material is composed only of carbon.

The amount of the conductive material is 0.1 to 3.0% by mass, more preferably 0.5 to 1.5% by mass, and even more preferably 0.7 to 1.3% by mass, based on the total mass of the positive electrode active material including the coated section. Excessive amount of the conductive material is not favorable in that the conductive material may come off the surface of the positive electrode active material and remain as isolated conducting agent particles.

For example, the coated section of the active material is formed in advance on the surface of the positive electrode active material particles, and is present on the surface of the positive electrode active material particles in the positive electrode active material layer. That is, the coated section of the active material in the present embodiment is not one newly formed in the steps following the preparation step of a positive electrode composition. In addition, the coated section of the active material is not one that comes off in the steps following the preparation step of a positive electrode composition.

For example, the coated section stays on the surface of the positive electrode active material even when the coated particles are mixed with a solvent by a mixer or the like during the preparation of a positive electrode composition. Further, the coated section stays on the surface of the positive electrode active material even when the positive electrode active material layer is detached from the positive electrode and then put into a solvent to dissolve the binder contained in the positive electrode active material layer in the solvent. Furthermore, the coated section stays on the surface of the positive electrode active material even when an operation to disintegrate agglomerated particles is implemented for measuring the particle size distribution of the particles in the positive electrode active material layer by the laser diffraction scattering method.

Examples of the method for producing the coated particles include a sintering method and a vapor deposition method.

Examples of the sintering method include a method that sinters an active material composition (for example, a slurry) containing the positive electrode active material particles and an organic substance at 500 to 1000° C. for 1 to 100 hours under atmospheric pressure. Examples of the organic substance added to the active material composition include salicylic acid, catechol, hydroquinone, resorcinol, pyrogallol, flu-oroglucinol, hexahydroxybenzene, benzoic acid, phthalic acid, terephthalic acid, phenylalanine, water dispersible phenolic resins, saccharides (e.g., sucrose, glucose and lactose), carboxylic acids (e.g., malic acid and citric acid), unsaturated monohydric alcohols (e.g., allyl alcohol and propargyl alcohol), ascorbic acid, and polyvinyl alcohol. This sintering method sinters an active material composition to allow carbon in the organic material to be fused to the surface of the positive electrode active material to thereby form the coated section of the active material.

Another example of the sintering method is the so-called impact sintering coating method.

The impact sintering coating method is, for example, carried our as follows. In an impact sintering coating device, a burner is ignited using a mixed gas of a hydrocarbon and oxygen as a fuel to burn the mixed gas in a combustion chamber, thereby generating a flame, wherein the amount of oxygen is adjusted so as not to exceed its equivalent amount that allows complete combustion of the fuel, to thereby lower the flame temperature. A powder supply nozzle is installed downstream thereof, from which a solid-liquid-gas three-phase mixture containing a combustion gas as well as a slurry formed by dissolving an organic substance for coating in a solvent is injected toward the flame. The injected fine powder is accelerated at a temperature not higher than the transformation temperature, the sublimation temperature, and the evaporation temperature of the powder material by increasing the amount of combustion gas maintained at room temperature to lower the temperature of the injected fine powder. This allows the particles of the powder to be instantly fused on the active material by impact, thereby forming coated particles of the positive electrode active material.

Examples of the vapor deposition method include a vapor phase deposition method such as a physical vapor deposition method (PVD) and a chemical vapor deposition method (CVD), and a liquid phase deposition method such as plating.

The positive electrode active material preferably contains a compound having an olivine crystal structure.

The compound having an olivine crystal structure is preferably a compound represented by the following formula: $LiFe_xM_{(1-x)}PO_4$ (hereinafter, also referred to as "formula (I)"). In the formula (I), $0 \leq x \leq 1$, M is Co, Ni, Mn, Al, Ti or Zr. A minute amount of Fe and M (Co, Ni, Mn, Al, Ti or Zr) may be replaced with another element so long as the replacement does not affect the physical properties of the compound. The presence of a trace amount of metal impurities in the compound represented by the formula (I) does not impair the effect of the present invention.

The compound represented by the formula (I) is preferably lithium iron phosphate represented by $LiFePO_4$ (hereinafter, also simply referred to as "lithium iron phosphate"). The compound is more preferably lithium iron phosphate particles having, on at least a part of their surfaces, a coated section including a conductive material (hereinafter, also referred to as "coated lithium iron phosphate particles"). It is more preferable that the entire surfaces of lithium iron phosphate particles are coated with a conductive material for achieving more excellent battery capacity and cycling performance.

The coated lithium iron phosphate particles can be produced by a known method.

For example, the coated lithium iron phosphate particles can be obtained by a method in which a lithium iron phosphate powder is prepared by following the procedure described in Japanese Patent No. 5098146, and at least a part of the surface of lithium iron phosphate particles in the powder is coated with carbon by following the procedure described in G S Yuasa Technical Report. June 2008, Vol. 5, No. 1, pp. 27-31 and the like.

Specifically, first, iron oxalate dihydrate, ammonium dihydrogen phosphate, and lithium carbonate are weighed to give a specific molar ratio, and these are pulverized and mixed in an inert atmosphere. Next, the obtained mixture is heat-treated in a nitrogen atmosphere to prepare a lithium iron phosphate powder. Then, the lithium iron phosphate powder is placed in a rotary kiln and heat-treated while supplying methanol vapor with nitrogen as a carrier gas to obtain a powder of lithium iron phosphate particles having at least a part of their surfaces coated with carbon.

For example, the particle size of the lithium iron phosphate powder can be adjusted by optimizing the pulverization time in the pulverization process. The amount of carbon coating the particles of the lithium iron phosphate powder can be adjusted by optimizing the heating time and temperature in the step of implementing heat treatment while supplying methanol vapor. It is desirable to remove the carbon particles not consumed for coating by subsequent steps such as classification and washing.

The positive electrode active material may contain other positive electrode active materials than the compound having an olivine type crystal structure.

Preferable examples of the other positive electrode active materials include a lithium transition metal composite oxide. Specific examples thereof include lithium cobalt oxide (LiCoO$_2$), lithium nickel oxide (LiNiO$_2$), lithium nickel cobalt aluminum oxide (LiNi$_x$Co$_y$Al$_z$O$_2$ with the proviso that x+y+z=1), lithium nickel cobalt manganese oxide (LiNi$_x$Co$_y$Mn$_z$O$_2$ with the proviso that x+y+z=1), lithium manganese oxide (LiMn2O$_4$), lithium manganese cobalt oxide (LiMnCoO$_4$), lithium manganese chromium oxide (LiMnCrO$_4$), lithium vanadium nickel oxide (LiNiVO$_4$), nickel-substituted lithium manganese oxide (e.g., LiMn$_{1.5}$Ni$_{0.5}$O$_4$), and lithium vanadium cobalt oxide (LiCoVO$_4$), as well as nonstoichiometric compounds formed by partially substituting the compounds listed above with metal elements. Examples of the metal element include one or more selected from the group consisting of Mn, Mg, Ni, Co, Cu, Zn and Ge.

With respect to the other positive electrode active materials, a single type thereof may be used individually or two or more types thereof may be used in combination.

The other positive electrode active material may have, on at least a part of its surface, the coated section described above.

The amount of the compound having an olivine type crystal structure is preferably 50% by mass or more, preferably 80% by mass or more, and even more preferably 90% by mass or more, based on the total mass of the positive electrode active material (including the mass of the coated section if present). This amount may be 100% by mass.

When the coated lithium iron phosphate particles are used, the amount of the coated lithium iron phosphate particles is preferably 50% by mass or more, more preferably 80% by mass or more, and even more preferably 90% by mass or more, based on the total mass of the positive electrode active material. This amount may be 100% by mass.

The average particle size of the positive electrode active material particles (that is, positive electrode active material powder) (including the thickness of the coated section if present) is, for example, preferably 0.1 to 5.0 µm, more preferably 0.2 to 3.0 µm. When two or more types of positive electrode active materials are used, the average particle size of each of such positive electrode active materials may be within the above range.

The average particle size of the positive electrode active material in the present specification is a volume-based median particle size measured using a laser diffraction/scattering particle size distribution analyzer.

The binder that can be contained in the positive electrode active material layer 12 is an organic substance, and examples thereof include polyacrylic acid, lithium polyacrylate, polyvinylidene fluoride, polyvinylidene fluoride-hexafluoropropylene copolymers, styrene butadiene rubbers, polyvinyl alcohol, polyvinyl acetal, polyethylene oxide, polyethylene glycol, carboxymethyl cellulose, polyacrylic nitrile, and polyimide. With respect to the binder, a single type thereof may be used alone or two or more types thereof may be used in combination.

The amount of the binder in the positive electrode active material layer 12 is, for example, preferably 4.0% by mass or less, and more preferably 2.0% by mass or less, based on the total mass of the positive electrode active material layer 12. When the amount of the binder is not more than the above upper limit value, the proportion of the substance that does not contribute to the conduction of lithium ions in the positive electrode active material layer 12 is reduced, and the battery performance can be further improved.

When the positive electrode active material layer 12 contains a binder, the lower limit of the amount of the binder is preferably 0.1% by mass or more, and more preferably 0.5% by mass or more, based on the total mass of the positive electrode active material layer 12.

That is, when the positive electrode active material layer 12 contains a binder, the amount of the binder is preferably 0.1% by mass to 4.0% by mass, and more preferably 0.5 to 2.0% by mass, based on a total mass of the positive electrode active material layer 12.

Examples of the conducting agent contained in the positive electrode active material layer 12 include carbon materials such as graphite, graphene, hard carbon, Ketjen black, acetylene black, and carbon nanotube (CNT). With respect to the conducting agent, a single type thereof may be used alone or two or more types thereof may be used in combination.

The amount of the conducting agent in the positive electrode active material layer 12 is, for example, preferably 4 parts by mass or less, more preferably 3 parts by mass or less, and even more preferably 1 part by mass or less, relative to 100 parts by mass of the positive electrode active material.

When the conducting agent is incorporated into the positive electrode active material layer 12, the lower limit value of the amount of the conducting agent is appropriately determined according to the type of the conducting agent, and is, for example, more than 0.1% by mass, based on the total mass of the positive electrode active material layer 12.

In the context of the present specification, the expression "the positive electrode active material layer 12 does not contain a conducting agent" or similar expression means that the positive electrode active material layer 12 does not substantially contain a conducting agent, and should not be construed as excluding a case where a conducting agent is contained in such an amount that the effects of the present invention are not affected. For example, if the amount of the conducting agent is 0.1% by mass or less, based on the total mass of the positive electrode active material layer 12, then, it is judged that substantially no conducting agent is contained.

(Positive Electrode Current Collector)

The positive electrode current collector body 14 is formed of a metal material. Examples of the metal material include conductive metals such as copper, aluminum, titanium, nickel, and stainless steel.

The thickness of the positive electrode current collector main body 14 is preferably, for example, 8 to 40 μm, and more preferably 10 to 25 μm.

The thickness of the positive electrode current collector main body 14 and the thickness of the positive electrode current collector 11 can be measured using a micrometer. One example of the measuring instrument usable for this purpose is an instrument with the product name "MDH-25M", manufactured by Mitutoyo Co., Ltd.

(Current Collector Coating Layer)

The current collector coating layer 15 contains a conductive material.

The conductive material in the current collector coating layer 15 preferably contains carbon (conductive carbon), and more preferably consists exclusively of carbon.

The current collector coating layer 15 is preferred to be, for example, a coating layer containing carbon particles such as carbon black and a binder. Examples of the binder for the current collector coating layer 15 include those listed above as examples of the binder for the positive electrode active material layer 12.

With regard to the production of the positive electrode current collector 11 in which the surface of the positive electrode current collector main body 14 is coated with the current collector coating layer 15, for example, the production can be implemented by a method in which a slurry containing the conductive material, the binder, and a solvent is applied to the surface of the positive electrode current collector main body 14 with a known coating method such as a gravure method, followed by drying to remove the solvent.

The thickness of the current collector coating layer 15 is preferably 0.1 to 4.0 μm.

The thickness of the current collector coating layer can be measured by a method of measuring the thickness of the coating layer in a transmission electron microscope (TEM) image or a scanning electron microscope (SEM) image of a cross section of the current collector coating layer. The thickness of the current collector coating layer need not be uniform. It is preferable that the current collector coating layer 15 having a thickness of 0.1 μm or more is present on at least a part of the surface of the positive electrode current collector main body 14, and the maximum thickness of the current collector coating layer is 4.0 μm or less.

(Method for Producing Positive Electrode)

For example, the positive electrode 1 of the present embodiment can be produced by a method in which a positive electrode composition containing a positive electrode active material, a binder and a solvent is coated on the positive electrode current collector 11, followed by drying to remove the solvent to thereby form a positive electrode active material layer 12. The positive electrode composition may contain a conducting agent.

The thickness of the positive electrode active material layer 12 can be adjusted by a method in which a layered body composed of the positive electrode current collector 11 and the positive electrode active material layer 12 formed thereon is placed between two flat plate jigs and, then, uniformly pressurized in the thickness direction of this layered body. For this purpose, for example, a method of pressurizing using a roll press can be used.

The solvent for the positive electrode composition is preferably a non-aqueous solvent. Examples of the solvent include alcohols such as methanol, ethanol, 1-propanol and 2-propanol; chain or cyclic amides such as N-methylpyrrolidone and N,N-dimethylformamide; and ketones such as acetone.

With respect to these solvents, a single type thereof may be used individually or two or more types thereof may be used in combination.

When at least one of the conductive material and the conducting agent covering the positive electrode active material contains carbon, the conductive carbon content is preferably 0.5 to 3.5% by mass, and preferably 1.0 to 3.0% by mass, based on the total mass of the positive electrode active material layer 12.

The conductive carbon content based the total mass of the positive electrode active material layer 12 can be measured by <<Method for measuring conductive carbon content>> described below with respect to a dried product (powder), as a measurement target, obtained by vacuum-drying, at 120° C., the positive electrode active material layer 12 detached from the current collector.

The conductive carbon to be measured by the <<Method for measuring conductive carbon content>> described below includes carbon in the coated section of the positive electrode active material, and carbon in the conducting agent. Carbon in the binder is not included in the conductive carbon to be measured.

When the conductive carbon content based the total mass of the positive electrode active material layer 12 is within the above range, the battery capacity can be further improved, and a non-aqueous electrolyte secondary battery with a further improved cycle characteristics can be realized.

When the positive electrode active material layer 12 includes a binder, the amount of carbon belonging to the binder is preferably 0.1 to 2.0% by mass, more preferably 0.2 to 1.7% by mass, and even more preferably 0.4 to 1.0% by mass, based on a total mass of the positive electrode active material layer 12.

The amount of carbon belonging to the binder, based the total mass of the positive electrode active material layer 12, can be measured by <<Method for measuring conductive carbon content>> described below with respect to a dried product (powder), as a measurement target, obtained by vacuum-drying, at 120° C. the positive electrode active material layer 12 detached from the current collector. For example, the first weight loss amount M1 in the measurement method A and the measurement method B described below can be measured as amount of carbon belonging to the binder. Alternatively, the carbon amount M4 of carbon belonging to the binder can be determined by the measurement method C described below.

As a method for obtaining the measurement target, for example, the following method can be adopted.

When the current collector coating layer 15 is not present on the positive electrode current collector main body 14 and only the positive electrode active material layer 12 is present on the positive electrode current collector main body 14, first, the positive electrode 1 is punched to obtain a piece having a predetermined size, and the layer (powder) present on the positive electrode current collector main body 14 is completely detached from the obtained piece by a method that immerses the piece in a solvent (for example, N-methylpyrrolidone) and stirs the resulting. Next, after confirming that no powder remains attached to the positive electrode current collector main body 14, the positive electrode current collector main body 14 is taken out from the solvent to obtain a suspension (slurry) containing the detached powder and the solvent. The obtained suspension is dried at 120° C. to completely volatilize the solvent to obtain the desired measurement target (powder).

When the current collector coating layer 15 and the positive electrode active material layer 12 are present on the positive electrode current collector main body 14, the measurement target to be used is a dried product (powder) obtained by detaching only the powder constituting the positive electrode active material layer 12 and vacuum drying the powder in an environment of 120° C. For example, the measurement target may be one obtained by detaching the outermost surface of the positive electrode active material layer 12 with a depth of several μm using a spatula or the like, and vacuum drying the resulting powder in an environment of 120° C.

The positive electrode 1 preferably has a conductive carbon content of 0.5 to 3.5% by mass, more preferably 1.5 to 3.0% by mass, with respect to the mass of the positive electrode 1 excluding the positive electrode current collector main body 14.

When the positive electrode 1 is composed of the positive electrode current collector main body 14 and the positive electrode active material layer 12, the mass of the positive electrode 1 excluding the positive electrode current collector main body 14 is the mass of the positive electrode active material layer 12.

When the positive electrode 1 is composed of the positive electrode current collector main body 14, the current collector coating layer 15, and the positive electrode active material layer 12, the mass of the positive electrode 1 excluding the positive electrode current collector main body 14 is the sum of the mass of the current collector coating layer 15 and the mass of the positive electrode active material layer 12.

The amount of the conductive carbon with respect to the mass of the positive electrode 1 excluding the positive electrode current collector main body 14 can be measured by <<Method for measuring conductive carbon content>> described below with respect to a dried product (powder), as a measurement target, obtained by detaching the whole of a layer present on the positive electrode current collector main body 14, collecting the whole of substance resulting from the detached layer, and vacuum-drying the collected substance at 120° C.

<<Method for Measuring Conductive Carbon Content>>
(Measurement Method A)

A sample having a weight w1 is taken from a homogeneously mixed product of the measurement target, and the sample is subjected to thermogravimetry differential thermal analysis (TG-DTA) implemented by following step A1 and step A2 defined below, to obtain a TG curve. From the obtained TG curve, the following first weight loss amount M1 (unit: % by mass) and second weight loss amount M2 (unit: % by mass) are obtained. By subtracting M1 from M2, the conductive carbon content (unit: % by mass) is obtained.

Step A1: A temperature of the sample is raised from 30° C. to 600° C. at a heating rate of 10° C./min and holding the temperature at 600° C. for 10 minutes in an argon gas stream of 300 mL/min to measure a resulting mass w2 of the sample, from which a first weight loss amount M1 is determined by formula (a1):

$$M1=(w1-w2)/w1\times100 \quad (a1).$$

Step A2: Immediately after the step A1, the temperature is lowered from 600° C. to 200° C. at a cooling rate of 10° C./min and held at 200° C. for 10 minutes, followed by completely substituting the argon gas stream with an oxygen gas stream. The temperature is raised from 200° C. to 1000° C. at a heating rate of 10° C./min and held at 1000° C. for 10 minutes in an oxygen gas stream of 100 mL/min to measure a resulting mass w3 of the sample, from which a second weight loss amount M2 (unit: % by mass) is calculated by formula (a2):

$$M2=(w1-w3)/w1\times100 \quad (a2).$$

(Measurement Method B)

0.0001 ng of a precisely weighed sample is taken from a homogeneously mixed product of the measurement target, and the sample is burnt under burning conditions defined below to measure an amount of generated carbon dioxide by a CHN elemental analyzer, from which a total carbon content M3 (unit: % by mass) of the sample is determined. Also, a first weight loss amount M1 is determined following the procedure of the step A1 of the measurement method A. By subtracting M1 from M3, the conductive carbon content (unit: % by mass) is obtained.

(Burning Conditions)
Temperature of combustion furnace: 1150° C.
Temperature of reduction furnace: 850° C.
Helium flow rate: 200 mL/min.
Oxygen flow rate: 25 to 30 mL/min.

(Measurement Method C)

The total carbon content M3 (unit: % by mass) of the sample is measured in the same manner as in the above measurement method B. Further, the carbon amount M4 (unit: % by mass) of carbon derived from the binder is determined by the following method. M4 is subtracted from M3 to determine a conductive carbon content (unit: % by mass).

When the binder is polyvinylidene fluoride (PVDF: monomer ($CH_2CF_2$), molecular weight 64), the conductive carbon content can be calculated by the following formula from the fluoride ion ($F^-$) content (unit: % by mass) measured by combustion ion chromatography based on the tube combustion method, the atomic weight (19) of fluorine in the monomers constituting PVDF, and the atomic weight (12) of carbon in the PVDF.

PVDF content (unit: % by mass)=fluoride ion content (unit: % by mass)×64/38

PVDF-derived carbon amount $M4$ (unit: % by mass) =fluoride ion content (unit: % by mass)×12/19

The presence of polyvinylidene fluoride as a binder can be verified by a method in which a sample or a liquid obtained by extracting a sample with an N,N-dimethylformamide (DMF) solvent is subjected to Fourier transform infrared spectroscopy (FT-IR) to confirm the absorption attributable to the C—F bond. Such verification can be also implemented by 19F-NMR measurement.

When the binder is identified as being other than PVDF, the carbon amount M4 attributable to the binder can be calculated by determining the amount (unit: % by mass) of the binder from the measured molecular weight, and the carbon content (unit: % by mass).

These methods are described in the following publications:

Toray Research Center, The TRC News No. 117 (September 2013), pp. 34-37, [Searched on Feb. 10, 2021], Internet <https://www.toray-research.co.jp/technical-info/trenews/pdf/TRC117(34-37).pdf>

TOSOH Analysis and Research Center Co., Ltd., Technical Report No. T1019 2017.09.20, [Searched on Feb. 10, 2021]. Internet <http://www.tosoh-arc.co.jp/techrepo/files/tarc00522/T1719N.pdf>

<<Analytical Method for Conductive Carbon>>

The conductive carbon in the coated section of the positive electrode active material and the conductive carbon as the conducting agent can be distinguished by the following analytical method.

For example, particles in the positive electrode active material layer are analyzed by a combination of transmission electron microscopy-electron energy loss spectroscopy (TEM-EELS), and particles having a carbon-derived peak around 290 eV only near the particle surface can be judged to be the positive electrode active material. On the other hand, particles having a carbon-derived peak inside the particles can be judged to be the conducting agent. In this context. "near the particle surface" means a region to the depth of approximately 100 nm from the particle surface, while "inside" means an inner region positioned deeper than the "near the particle surface".

As another method, the particles in the positive electrode active material layer are analyzed by Raman spectroscopy mapping, and particles showing carbon-derived G-band and D-band as well as a peak of the positive electrode active material-derived oxide crystals can be judged to be the positive electrode active material. On the other hand, particles showing only G-band and D-band can be judged to be the conducting agent.

As still another method, a cross section of the positive electrode active material layer is observed with scanning spread resistance microscope (SSRM). When the particle surface has a region with lower resistance than the inside of the particle, the region with lower resistance can be judged to be the conductive carbon present in the coated section of the active material. Other particles that are present isolatedly and have low resistance can be judged to be the conducting agent.

In this context, a trace amount of carbon considered to be an impurity and a trace amount of carbon unintentionally removed from the surface of the positive electrode active material during production are not judged to be the conducting agent. Using any of these methods, it is possible to verify whether or not the conducting agent formed of carbon material is contained in the positive electrode active material layer.

(Thickness Distribution of Positive Electrode)

The thickness distribution of the positive electrode in the present specification is measured by a method that detects unevenness on the outermost surface of a positive electrode while scanning along a direction perpendicular to the thickness direction of the positive electrode current collector 11.

For example, a target sheet cut out from the positive electrode is inserted between two rotating rolls (a measuring roll and a backup/feed roll), and the sensor detects vertical movements of the measuring roll to measure the change of thickness (thickness distribution). One example of the measuring device is a desktop thickness gauge (product name "Rotary Caliber Meter RC-19", manufactured by Maysun Co., Ltd.).

In this measuring method, the unevenness of the outermost surface on the measuring roll side is detected as a change in thickness. The unevenness of the outermost surface on the backup/feed roll side is not reflected in the thickness distribution.

The size of the target sheet is 50 mm or more in the scanning direction (rotational direction of the roll) and 20 mm or more in the direction perpendicular to the scanning direction. Assuming that the total length to be scanned (from one end to the other end of the target sheet) is 100%, the thickness distribution adopted is a measurement result obtained with respect to a central region that remains when a region with a 20% length at one end (from which the scanning starts) and a region with a 20% length at the other end (at which the scanning ends) are excluded, for the purpose of eliminate errors due to cutting.

The target sheet is inserted into the measuring device such that the surface of the positive electrode active material layer 12 is the outermost surface on the measuring roll side.

The measurement of the thickness distribution of the positive electrode is performed with respect to at least any two directions (first direction and second direction) orthogonal to each other as scanning directions.

The thickness distribution in the first direction is obtained, and the average thickness a1, the maximum thickness b1, and the minimum thickness c1 are obtained. Further, the thickness d1 which is the largest in terms of an absolute value of difference from the average thickness a1 is obtained. d1 is b1 or c1. The relationship may be d1=b1=c1. That is, if (b1−a1)>(a1−c1), then d1=b1; if (b1−a1)<(a1−c1), then d1=c1; and if (b1−a1)=(a1−c1), then d1=b1=c1.

Similarly, the thickness distribution in the second direction is obtained, and the average thickness a2, the maximum thickness b2, and the minimum thickness c2 are obtained. Further, the thickness d2 which is the largest in terms of an absolute value of difference from the average thickness a2 is obtained, d2 is b2 or c2. The relationship may be d2=b2=c2. That is, if (b2−a2)>(a2−c2), then d2=b2; if (b2−a2)<(a2−c2), then d2=c2; and if (b2−a2)=(a2−c2), then d2=b2=c2.

In the positive electrode 1 of the present embodiment, the thickness distribution in the first direction satisfies the following inequations 1 and 2, and the thickness distribution in the second direction satisfies the following inequations 3 and 4:

$$0.990 \leq (d1/a1) \leq 1.010 \quad \text{Inequation 1}$$

$$(b1-c1) \leq 5.0 \ \mu m \quad \text{Inequation 2}$$

$$0.990 \leq (d2/a2) \leq 1.010 \quad \text{Inequation 3}$$

$$(b2-c2) \leq 5.0 \ \mu m \quad \text{Inequation 4}$$

As the values of d1/a1 and d2/a2 get closer to 1, the surface smoothness of the positive electrode active material layer 12 increases.

Further, (b1−c1) and (b2−c2) represent the amplitude of unevenness on the surface of the positive electrode active material layer 12.

The positive electrode 1 satisfying the above formulae 1 to 4 is excellent in the smoothness of the surface of the positive electrode active material layer 12 and is excellent in the effect of improving the high-rate cycling performance of a non-aqueous electrolyte secondary battery. The positive electrode 1 shows such advantages presumably because side reactions between the positive electrode and the electrolytic solution on the outermost surface of the positive electrode are suppressed, and the deterioration in the high-rate charge/discharge cycle is thereby suppressed.

The values of d1/a1 and d2/a2 are 0.990 or more and 1.010 or less, preferably 0.991 or more and 1.009 or less, and more preferably 0.992 or more and 1.008 or less.

The values of (b1−c1) and (b2−c2) are 5.0 μm or less, preferably 4.0 μm or less, and more preferably 3.0 μm or less. The lower limit of (b1−c1) and (b2−c2) is not particularly limited and may be zero.

The smoothness of the surface of the positive electrode active material layer 12 can be controlled by, for example, adjusting the particle size distribution of the particles present in the positive electrode active material layer 12.

The median diameter (hereinbelow, also referred to as "D50") in the particle size distribution of the particles present in the positive electrode active material layer 12 is preferably 5.0 μm or less, preferably 4.0 μm or less, and more preferably 3.0 μm or less.

When D50 is not more than the above upper limit value, it is possible to achieve excellent effect of improving the smoothness. The lower limit of D50 is not particularly limited, but is preferably 1.0 m or more, more preferably 2.0 μm or more, in view of the likelihood of coarse particles being formed due to agglomeration of fine particles, and the influence of the presence of such coarse particles that decreases the smoothness.

D50 can be controlled, for example, by adjusting the amount of fine powder contained in the positive electrode active material. D50 can be decreased by using a positive electrode active material with less fine powder content. When a conducting agent is used. D50 can also be adjusted by the blending amount of the conducting agent. D50 can be decreased by reducing the blending amount of the conducting agent.

In the present specification, the particle size distribution of the particles present in the positive electrode active material layer 12 is a volume-based particle size distribution obtained by measurement using a laser diffraction/scattering particle size distribution analyzer.

A sample used for the measurement is an aqueous dispersion prepared by detaching the positive electrode active material layer 12 from the positive electrode 1 and dispersing the particles that had been present in the positive electrode active material layer 12 in water. It is preferable to ultrasonically treat the aqueous dispersion to sufficiently disperse the particles.

The surface smoothness of the positive electrode active material layer 12 can also be controlled by adjusting the blending amount of the binder. When the amount of the binder is small, the particles are less likely to agglomerate and the smoothness is likely to improve. The smaller the blending amount of the binder, the lower the carbon content belonging to the binder.

The surface smoothness of the positive electrode active material layer 12 can also be controlled by adjusting the blending amount of the conducting agent. When the amount of the conducting agent is small, the particles are less likely to agglomerate and the smoothness is likely to improve.

When the conducting agent contains carbon, the smaller the amount of the conducting agent, the lower the conductive carbon content.

The smoothness of the surface of the positive electrode active material layer 12 can also be controlled by adjusting the pressure applied for pressing the layered body in which the positive electrode active material layer 12 is formed on the positive electrode current collector 11. The application of higher pressure renders easier the improvement of smoothness. The application of high pressure increases the volume density of the positive electrode active material layer 12.

The volume density of the positive electrode active material layer 12 is preferably 2.10 to 2.50 g/cm³, more preferably 2.15 to 2.45 g/cm³, and even more preferably 2.20 to 2.35 g/cm³. The volume density of the positive electrode active material layer 12 can be measured by, for example, the following measuring method.

The thicknesses of the positive electrode 1 and the positive electrode current collector 11 are each measured with a micrometer, and the difference between these two thickness values is calculated as the thickness of the positive electrode active material layer 12. With respect to the thickness of the positive electrode 1 and the thickness of the positive electrode current collector 11, each of these thickness values is an average value of the thickness values measured at five or more arbitrarily chosen points. The thickness of the positive electrode current collector 11 may be measured at the exposed section 13 of the positive electrode current collector, which is described below.

The mass of the measurement sample punched out from the positive electrode so as to have a predetermined area is measured, from which the mass of the positive electrode current collector 11 measured in advance is subtracted to calculate the mass of the positive electrode active material layer 12.

The volume density of the positive electrode active material layer 12 is calculated by the following formula (1).

Volume density (unit: g/cm³)=mass of positive electrode active material layer (unit: g)/[(thickness of positive electrode active material layer (unit: cm))×area of measurement sample (Unit: cm²)]  (1)

Further, when the positive electrode active material in the positive electrode active material layer 12 is covered with the conductive material, the smoothness of the surface of the positive electrode active material layer 12 tends to improve. The unevenness of the surface is alleviated presumably because the pressurization of the layered body having the positive electrode active material layer 12 formed on the positive electrode current collector 11 causes the coated section of the active material to be deformed and crushed.

Further, when the positive electrode current collector 11 has the current collector coating layer 15, the smoothness of the surface of the positive electrode active material layer 12 tends to improve. In this case, the unevenness of the surface is alleviated presumably because the pressurization of the layered body having the positive electrode active material layer 12 formed on the positive electrode current collector 11 causes the positive electrode active material particles to dig into the current collector coating layer 15.

<Non-Aqueous Electrolyte Secondary Battery>

The non-aqueous electrolyte secondary battery 10 of the present embodiment shown in FIG. 2 includes a positive electrode 1 of the present embodiment, a negative electrode 3, and a non-aqueous electrolyte. Further, a separator 2 may be provided. Reference numeral 5 in FIG. 1 denotes an outer casing.

In the present embodiment, the positive electrode 1 has a plate-shaped positive electrode current collector 11 and positive electrode active material layers 12 provided on both surfaces thereof. The positive electrode active material layer 12 is present on a part of each surface of the positive electrode current collector 11. The edge of the surface of the positive electrode current collector 11 is an exposed section 13 of the positive electrode current collector, which is free of the positive electrode active material layer 12. A terminal tab (not shown) is electrically connected to an arbitrary portion of the exposed section 13 of the positive electrode current collector.

The negative electrode 3 has a plate-shaped negative electrode current collector 31 and negative electrode active material layers 32 provided on both surfaces thereof. The negative electrode active material layer 32 is present on a part of each surface of the negative electrode current collector 31. The edge of the surface of the negative electrode current collector 31 is an exposed section 33 of the negative electrode current collector, which is free of the negative electrode active material layer 32. A terminal tab (not shown) is electrically connected to an arbitrary portion of the exposed section 33 of the negative electrode current collector.

The shapes of the positive electrode 1, the negative electrode 3 and the separator 2 are not particularly limited. For example, each of these may have a rectangular shape in a plan view.

With regard to the production of the non-aqueous electrolyte secondary battery 10 of the present embodiment, for example, the production can be implemented by a method in which the positive electrode 1 and the negative electrode 3 are alternately interleaved through the separator 2 to produce an electrode layered body, which is then packed into an outer casing such as an aluminum laminate bag, and a non-aqueous electrolyte (not shown) is injected into the outer casing, followed by sealing the outer casing. FIG. 2 shows a representative example of a structure of the battery in which the negative electrode, the separator, the positive electrode, the separator, and the negative electrode are stacked in this order, but the number of electrodes can be altered as appropriate. The number of the positive electrode 1 may be one or more, and any number of positive electrodes 1 can be used depending on a desired battery capacity. The number of each of the negative electrode 3 and the separator 2 is larger by one sheet than the number of the positive electrode 1, and these are stacked so that the negative electrode 3 is located at the outermost layer.

(Negative Electrode)

The negative electrode active material layer 32 includes a negative electrode active material. Further, the negative electrode active material layer 32 may further include a binder. Furthermore, the negative electrode active material layer 32 may include a conducting agent as well. The shape of the negative electrode active material is preferably particulate.

For example, the negative electrode 3 can be produced by a method in which a negative electrode composition containing a negative electrode active material, a binder and a solvent is prepared, and coated on the negative electrode current collector 31, followed by drying to remove the solvent to thereby form a negative electrode active material layer 32. The negative electrode composition may contain a conducting agent.

Examples of the negative electrode active material and the conducting agent include carbon materials such as graphite, graphene, hard carbon. Ketjen black, acetylene black, and carbon nanotube (CNT). With respect to each of the negative electrode active material and the conducting agent, a single type thereof may be used alone or two or more types thereof may be used in combination.

Examples of the material of the negative electrode current collector 31, the binder and the solvent in the negative electrode composition include those listed above as examples of the material of the positive electrode current collector 11, the binder and the solvent in the positive electrode composition. With respect to each of the binder and the solvent in the negative electrode composition, a single type thereof may be used alone or two or more types thereof may be used in combination.

The sum of the amount of the negative electrode active material and the amount of the conducting agent is preferably 80.0 to 99.9% by mass, and more preferably 85.0 to 98.0% by mass, based on the total mass of the negative electrode active material layer 32.

(Separator)

The separator 2 is disposed between the negative electrode 3 and the positive electrode 1 to prevent a short circuit or the like. The separator 2 may retain a non-aqueous electrolyte described below.

The separator 2 is not particularly limited, and examples thereof include a porous polymer film, a non-woven fabric, and glass fiber.

An insulating layer may be provided on one or both surfaces of the separator 2. The insulating layer is preferably a layer having a porous structure in which insulating fine particles are bonded with a binder for an insulating layer.

The separator 2 may contain various plasticizers, antioxidants, and flame retardants.

Examples of the antioxidant include phenolic antioxidants such as hindered-phenolic antioxidants, monophenolic antioxidants, bisphenolic antioxidants, and polyphenolic antioxidants; hinderedamine antioxidants; phosphorus antioxidants; sulfur antioxidants; benzotriazole antioxidants; benzophenone antioxidants; triazine antioxidants; and salicylate antioxidants. Among these, phenolic antioxidants and phosphorus antioxidants are preferable.

(Non-Aqueous Electrolyte)

The non-aqueous electrolyte fills the space between the positive electrode 1 and the negative electrode 3. For example, any of known non-aqueous electrolytes used in lithium ion secondary batteries, electric double layer capacitors and the like can be used.

As the non-aqueous electrolyte, a non-aqueous electrolyte solution in which an electrolyte salt is dissolved in an organic solvent is preferable.

The organic solvent is preferably one having tolerance to high voltage. Examples of the organic solvent include polar solvents such as ethylene carbonate, propylene carbonate, dimethyl carbonate, diethyl carbonate, ethyl methyl carbonate, γ-butyrolactone, sulfolane, dimethyl sulfoxide, acetonitrile, dimethylformamide, dimethylacetamide, 1,2-dimethoxyethane, 1,2-diethoxyethane, tetrahydrafuran, 2-methyltetrahydrofuran, dioxolane, and methyl acetate, as well as mixtures of two or more of these polar solvents.

The electrolyte salt is not particularly limited, and examples thereof include lithium-containing salts such as $LiClO_4$, $LiPF_4$, $LiBF_4$, $LiAsF_6$, $LiCF_6$, $LiCF_3CO_2$, $LiPF_6SO_3$, $LiN(SO_2F)_2$, $LiN(SO_2CF_3)_2$, $Li(SO_2CF_2CF_3)_2$, $LiN(COCF_3)_2$, and $LiN(COCF_2CF3)_2$, as well as mixture of two or more of these salts.

With regard to the production of the non-aqueous electrolyte secondary battery of the present embodiment, for example, the production can be implemented by a method that prepares an electrode layered body in which the separator 2 is disposed between the positive electrode 1 and the negative electrode 3, which is then packed into an outer casing 5 such as an aluminum laminate bag, and injects a non-aqueous electrolyte into the outer casing.

The non-aqueous electrolyte secondary battery of this embodiment can be used as a lithium ion secondary battery for various purposes such as industrial use, consumer use, automobile use, and residential use.

The application of the non-aqueous electrolyte secondary battery of this embodiment is not particularly limited. For example, the battery can be used in a battery module configured by connecting a plurality of non-aqueous electrolyte secondary batteries in series or in parallel, a battery system including a plurality of electrically connected battery modules and a battery control system, and the like.

Examples of the battery system include battery packs, stationary storage battery systems, automobile power storage battery systems, automobile auxiliary storage battery systems, emergency power storage battery systems, and the like.

Further, in the present invention, the features of the first embodiment and the second embodiment described above can be appropriately combined. Specifically, the present invention further provides the following embodiments.

[C1] A positive electrode for a non-aqueous electrolyte secondary battery, including a positive electrode current collector and a positive electrode active material layer provided on the positive electrode current collector, wherein the positive electrode active material layer includes a positive electrode active material, and one or both of (C1-1) and (C1-2) below are satisfied:

(C1-1) an integrated value (a) is 3 to 15%, preferably 4 to 12%, more preferably 5 to 10%, which is an integrated value of frequency of particle diameters of 1 μm or less, and a frequency (b) is 8 to 20%, preferably 9 to 18%, more preferably 11 to 15%, which is a frequency of a diameter with a maximum frequency, each determined from a volume-based particle size distribution curve of particles present in the positive electrode active material layer; and (C1-2) when two directions perpendicular to a thickness direction of the positive electrode current collector and orthogonal to each other are defined as a first direction and a second direction, an average thickness a1, a maximum thickness b1 and a minimum thickness c1 in a thickness distribution in the first direction as well as a thickness d1 which is largest in terms of an absolute value of the difference from the average thickness a1 satisfy inequations 1 and 2:

$$0.990 \leq (d1/a1) \leq 1.010 \quad \text{Inequation 1, and}$$

$$(b1-c1) \leq 5.0 \, \mu m \quad \text{Inequation 2, and}$$

an average thickness a2, a maximum thickness b2 and a minimum thickness c2 in a thickness distribution in the second direction as well as a thickness d2 which is largest in terms of an absolute value of the difference from the average thickness a2 satisfy inequations 3 and 4:

$$0.990 \leq (d2/a2) \leq 1.010 \quad \text{Inequation 3, and}$$

$$(b2-c2) \leq 5.0 \, \mu m \quad \text{Inequation 4,}$$

with the proviso that d1/a1 and d2/a2 in the formulae 1 and 3 are preferably 0.991 or more and 1.009 or less, more preferably 0.992 or more and 1.008 or less, and (b1−c1) and (b2−c2) in the formulae 2 and 4 are preferably 4.0 μm or less, more preferably 3.0 μm or less.

[C2] The positive electrode according to [C1], wherein a single peak is present in the particle size distribution curve with frequency as an ordinate.

[C3] The positive electrode for a non-aqueous electrolyte secondary battery according to [C1] or [C2], which has a distribution width (c) of 2.0 to 20.0 μm, preferably 2.0 to 15.0 μm, more preferably 2.5 to 10.0 μm, which is a value obtained by subtracting a 10% diameter from a 90% diameter in a first normal distribution with a smaller average diameter of two normal distributions obtained by waveform separation of the particle size distribution curve with frequency as an ordinate.

[C4] The positive electrode according to any one of [C1] to [C3], which has an integrated value (d) of 1 to 30%, preferably 4 to 27%, more preferably 7 to 24%, which is an integrated value of frequency of particle diameters of 1 μm or less in a first normal distribution with a smaller average diameter of two normal distributions obtained by waveform separation of the particle size distribution curve with frequency as an ordinate.

[C5] The positive electrode active material according to any one of [C1] to [C4], wherein the positive electrode active material comprises a compound represented by a formula $LiFe_xM_{(1-x)}PO_4$, wherein $0 \leq x \leq 1$, M is Co, Ni, Mn, Al, Ti or Zr.

[C6] The positive electrode according to any one of [C1] to [C5], wherein the positive electrode active material has, on at least a part of its surface, a coated section including a conductive material which preferably includes carbon, with the proviso that an amount of the conductive material is preferably 0.1 to 3.0% by mass, more preferably 0.5 to 1.5% by mass, even more preferably 0.7 to 1.3% by mass, based on a total mass of the positive electrode active material including the coated section.

[C7] The positive electrode according to any one of [C1] to [C6], wherein the positive electrode active material layer further includes a conducting agent, which is preferably at least one carbon material selected from the group consisting of graphite, graphene, hard carbon, Ketjen black, acetylene black, and carbon nanotube (CNT).

[C8] The positive electrode according to any one of [C1] to [C6], wherein the positive electrode active material layer does not include a conducting agent,

[C9] The positive electrode according to any one of [C1] to [C8], wherein a current collector coating layer is present on a surface of the positive electrode current collector on a side of the positive electrode active material layer.

[C10] The positive electrode according to any one of [C1] to [C9], wherein the particles present in the positive electrode active material layer have a median diameter of 5.0 μm or less, preferably 1.0 μm to 5.0 μm, preferably 1.0 μm to 4.0 μm, more preferably 2.0 μm to 3.0 μm, based on a volume-based particle size distribution.

[C11] The positive electrode according to [C6] or [C7], wherein an amount of conductive carbon is 0.5 to 3.5% by mass, preferably 1.0 to 3.0% by mass, based on a total mass of the positive electrode active material layer.

[C12] The positive electrode according to any one of [C1] to [C11], wherein the positive electrode active material layer includes a binder, and an amount of carbon belonging to the binder is 0.1 to 2.0% by mass, preferably 0.2 to 1.7% by mass, more preferably 0.4 to 1.0% by mass, based on a total mass of the positive electrode active material layer.

[C13] The positive electrode according to any one of [C1] to [C12], wherein the positive electrode active material layer has a volume density of 2.10 to 2.50 g/cm$^3$, preferably 2.15 to 2.45 g/cm$^3$, more preferably 2.20 to 2.35 g/cm$^3$.

[C14] A non-aqueous electrolyte secondary battery, including the positive electrode of any one of [C1] to [C13], a negative electrode, and a non-aqueous electrolyte disposed between the positive electrode and the negative electrode.

[C15] A battery module or battery system including a plurality of the non-aqueous electrolyte secondary batteries of [C14].

In these embodiments, it is preferable to satisfy both (C1-1) and (C1-2) for surely obtaining the effects of the present invention.

EXAMPLES

Hereinbelow, the present invention will be described with reference to Examples which, however, should not be construed as limiting the present invention.

<Measurement Method in Examples A1 to A6>
(Particle Size Distribution Measuring Method)

The outermost surface of the positive electrode active material layer 12 with a depth of several μm was removed with a spatula or the like, and the resulting powder was dispersed in water to obtain a dispersion as a sample.

The measurement was implemented using a laser diffraction particle size distribution analyzer (product name "LA-960V2", manufactured by Horiba, Ltd.), and a flow cell. The sample was circulated, stirred and irradiated with ultrasonic waves (5 minutes), and the particle size distribution was measured while keeping the dispersion state sufficiently stable.

A volume-based particle size distribution curve P was obtained, and an integrated value (a) (unit: %) of the frequency of particle diameters of 1 μm or less and a frequency (b) (unit: %) at the mode diameter were obtained.

Further, using a peak separation analysis program attached to the laser diffraction particle size distribution analyzer, the particle size distribution curve P was waveform-separated into two normal distributions to obtain a first normal distribution and a second normal distribution. The analysis conditions for waveform separation were as follows: the number of constituent distributions was 2, and the assigned initial values were an average diameter of 1 μm and a variance of 0.5 for the first normal distribution, and an average diameter of 8 μm and a variance of 3 for the second normal distribution. Of the two obtained normal distributions, D90 and D10 in the first normal distribution having the smaller average were obtained, and the value of the distribution width (c) (D90−D10) was calculated. Further, the integrated value (d) of the frequency of particle diameters of 1 μm or less in the first normal distribution was obtained.

(Volume Density Measuring Method)

The thickness of the positive electrode sheet and the thickness of the positive electrode current collector at its exposed section 13 were measured using a micrometer. Each thickness was measured at 5 arbitrarily chosen points, and an average value was calculated.

5 sheets of measurement samples were prepared by punching the positive electrode sheet into circles with a diameter of 16 mm.

Each measurement sample was weighed with a precision balance, and the mass of the positive electrode active material layer 12 in the measurement sample was calculated by subtracting the mass of the positive electrode current collector 11 measured in advance from the measurement result. The volume density of the positive electrode active material layer was calculated from the average value of measured values by the above formula (I).

<Evaluation Method in Examples A1 to A6>
(High Temperature/High Rate Cycle Test)

The capacity retention was evaluated following the procedures (1) to (7) below.

(1) A non-aqueous electrolyte secondary battery (cell) was manufactured so as to have a rated capacity of 1 Ah, and a cycle evaluation was carried out in an atmosphere of 50° C.

(2) The obtained cell was charged at a constant current rate of 0.2 C (that is, 200 mA) and with a cut-off voltage of 3.6 V, and then charged at a constant voltage with a cut-off current set at 1/10 of the above-mentioned charge current (that is, 20 mA).

(3) The cell was discharged for capacity confirmation at a constant current rate of 0.2 C and with a cut-off voltage of 2.5 V. The discharge capacity at this time was set as the reference capacity, and the reference capacity was set as the current value at 1 C rate (that is, 1,000 mA).

(4) After charging the cell at a constant current at a cell's 5C rate (that is, 5000 mA) and with a cut-off voltage of 3.7 V, a 10-second pause was provided. From this state, the cell was discharged at 5C rate and with a cut-off voltage of 2.0 V, and a 10-second pause was provided.

(5) The cycle test of (4) was repeated 1,000 times.

(6) After performing the same charging as in (2), the same capacity confirmation as in (3) was performed.

(7) By dividing the discharge capacity in the capacity confirmation measured in (6) by the reference capacity before the cycle test to obtain a capacity retention after 1,000 cycles in terms of percentage (1,000-cycle capacity retention, unit: %).

Production Example 1: Production of Negative Electrode 100 parts by mass of artificial graphite as a negative electrode active material, 1.5 parts by mass of styrene-butadiene rubber as a binder, 1.5 parts by mass of carboxymethyl cellulose Na as a thickener, and water as a solvent were mixed, to thereby obtain a negative electrode composition having a solid content of 50% by mass.

The obtained negative electrode composition was applied onto both sides of a copper foil (thickness 8 μm) and vacuum dried at 100° C. Then, the resulting was pressure-pressed under a load of 2 kN to obtain a negative electrode sheet. The obtained negative electrode sheet was punched to obtain a negative electrode.

Examples A1 to A6

Examples A1 to A4 are implementation of the present invention, while Examples A5 and A6 are comparative examples.

The powder materials used for the positive electrode active material layer are as follows.

Positive electrode active material (1): Carbon-coated lithium iron phosphate, average particle size 1.5 μm, carbon content 1.0% by mass Positive electrode active material (2): Carbon-coated lithium iron phosphate, average particle size 1.0 μm, carbon content 1.0% by mass Positive electrode active material (3): Carbon-coated lithium iron phosphate, average particle size 10.0 μm, carbon content 1.0% by mass Conducting agent (1): Carbon black Polyvinylidene fluoride (PVDF) was used as binder.

Example A1

First, a positive electrode current collector 11 was prepared by coating both the front and back surfaces of a positive electrode current collector main body 14 with current collector coating layers 15 by the following method. An aluminum foil (thickness 15 μm) was used as the positive electrode current collector main body 14.

A slurry was obtained by mixing 100 parts by mass of carbon black, 40 parts by mass of polyvinylidene fluoride as a binder, and N-methylpyrrolidone (NMP) as a solvent. The amount of NMP used was the amount required for applying the slurry.

The obtained slurry was applied to both sides of the positive electrode current collector main body 14 by a gravure method so as to allow the resulting current collector coating layers 15 after drying (total of layers on both sides) to have a thickness of 2 μm, and dried to remove the solvent, thereby obtaining a positive electrode current collector 11. The current collector coating layers 15 on both surfaces were formed so as to have the same amount of coating and the same thickness.

Next, a positive electrode active material layer 12 was formed by the following method.

As shown in Table 1, 100 parts by mass of the positive electrode active material (1), 0.5 part by mass of the conducting agent (1), 1.0 part by mass of PVDF as a binder, and NMP as a solvent were mixed with a mixer to obtain a positive electrode composition. The amount of the solvent used was the amount required for applying the positive electrode composition. (In Table 1, the alphabetical character "A" preceeding the numbers in the notation of the Example numbers A1 to A6 is omitted. In Table 2 et seq., the alphabetical character (A or B) preceding the numbers is likewise omitted.) The positive electrode composition was applied on both sides of the positive electrode current collector 11, and after pre-drying, the applied composition was vacuum-dried at 120° C. to form positive electrode active material layers 12. The coating volume of the positive electrode composition was 30 mg/cm$^2$ (total volume for both sides). The positive electrode active material layers 12 on both surfaces of the positive electrode current collector 11 were formed so as to have the same coating amount and the same thickness. The resulting layered body was pressure-pressed (rolled) with a load of 10 kN to obtain a positive electrode sheet.

Figure 3:
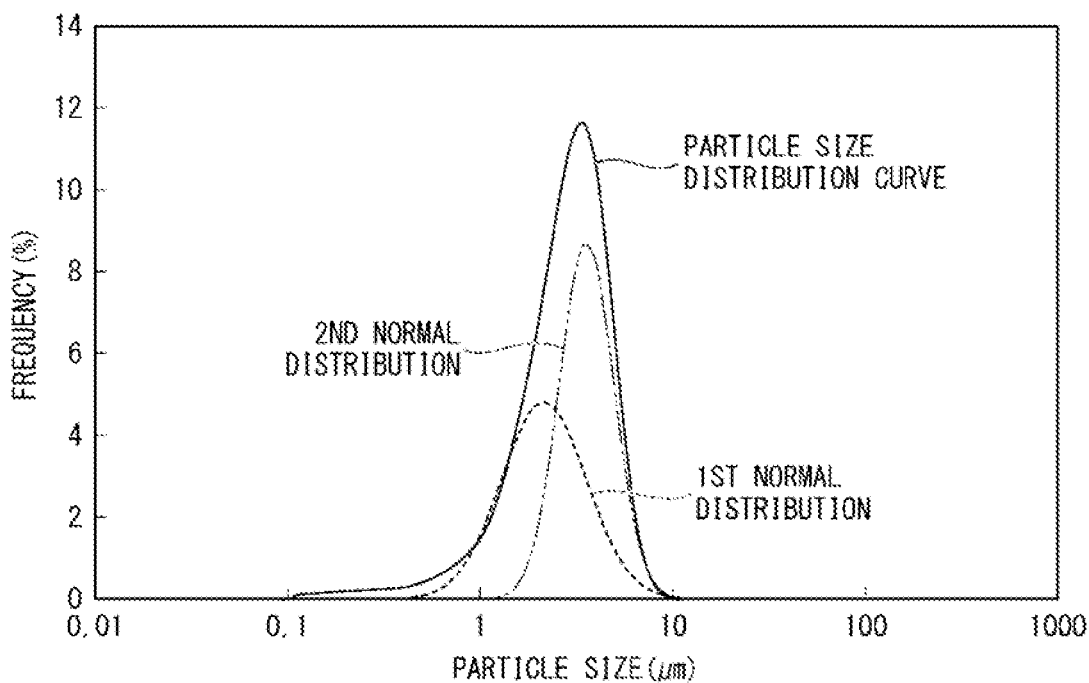
FIG. 3 is a graph showing a particle size distribution curve, a first normal distribution, and a second normal distribution in Example A1.

With respect to the obtained positive electrode sheet, the volume density of the positive electrode active material layer and the particle size distribution of the particles present in the positive electrode active material layer were measured by the above method, and the values of the respective items shown in Table 2 were obtained (hereinbelow, the same applies). The obtained particle size distribution curve is shown in FIG. 3.

The obtained positive electrode sheet was punched to obtain a positive electrode.

A non-aqueous electrolyte secondary battery having a configuration shown in FIG. 2 was manufactured by the following method.

LiPF$_6$ as an electrolyte was dissolved at 1 mol/L in a solvent in which ethylene carbonate (EC) and diethyl carbonate (DEC) were mixed at a volume ratio, EC:DEC, of 3:7, to thereby prepare a non-aqueous electrolytic solution.

The positive electrode obtained in this example and the negative electrode obtained in Production Example 1 were alternately interleaved through a separator to prepare an electrode layered body with its outermost layer being the negative electrode. A polyolefin film (thickness 15 μm) was used as the separator.

In the step of producing the electrode layered body, the separator 2 and the positive electrode 1 were first stacked, and then the negative electrode 3 was stacked on the separator 2.

Terminal tabs were electrically connected to the exposed section 13 of the positive electrode current collector and the exposed section 33 of the negative electrode current collector in the electrode layered body, and the electrode layered body was put between aluminum laminate films while allowing the terminal tabs to protrude to the outside. Then, the resulting was laminate-processed and sealed at three sides.

To the resulting structure, a non-aqueous electrolytic solution was injected from one side left unsealed, and this one side was vacuum-sealed to manufacture a non-aqueous electrolyte secondary battery (laminate cell).

The high temperature-high rate cycle test was carried out by the above method to measure the 1,000-cycle capacity retention. The results are shown in Table 2 (the same applies to the other examples).

Example A2

Figure 4:
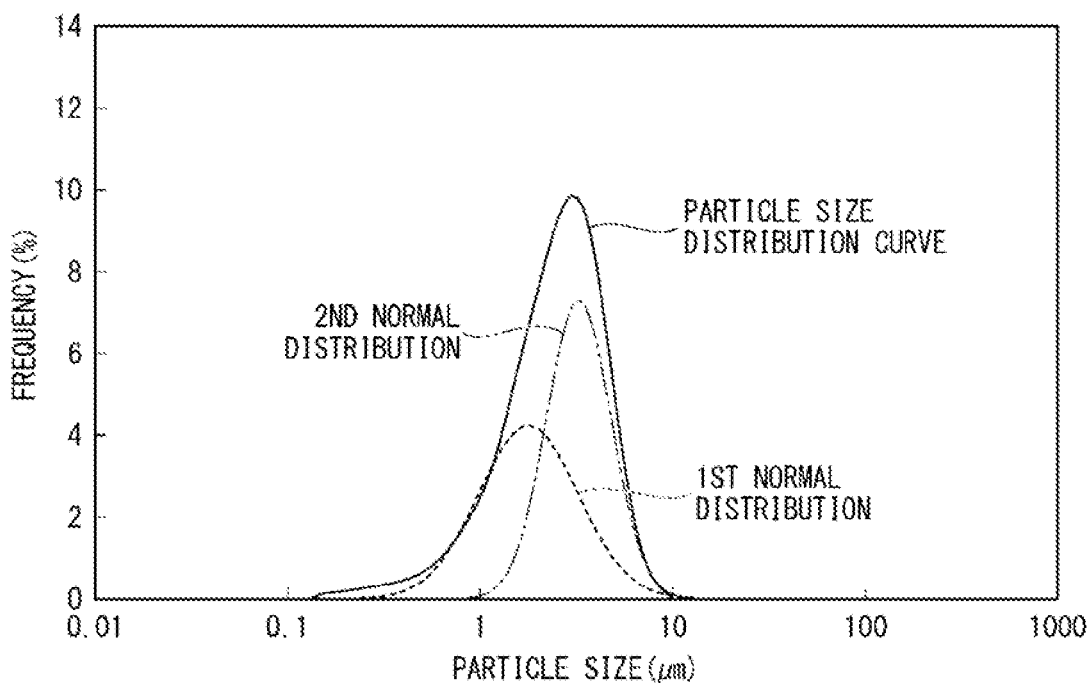
FIG. 4 is a graph showing a particle size distribution curve, a first normal distribution, and a second normal distribution in Example A2.

100 parts by mass of the positive electrode active material (2) was used instead of the positive electrode active material (1) used in Example A1. Except this point, a positive electrode sheet was prepared in the same manner as in Example A1, and the particle size distribution was measured. The obtained particle size distribution curve is shown in FIG. 4.

Further, a non-aqueous electrolyte secondary battery was manufactured and evaluated in the same manner as in Example A1.

Example A3

100 parts by mass of the positive electrode active material (3) was used instead of the positive electrode active material (1) used in Example A1. Except this point, a positive electrode sheet was prepared in the same manner as in Example A1, and the particle size distribution was measured.

Further, a non-aqueous electrolyte secondary battery was manufactured and evaluated in the same manner as in Example A1.

Example A4

A positive electrode sheet was prepared in the same manner as in Example A2 except that the conducting agent (1) was omitted, and the particle size distribution was measured to obtain the values of the respective items shown in Table 2.

Further, a non-aqueous electrolyte secondary battery was manufactured and evaluated in the same manner as in Example A1.

Example A5

Figure 5:
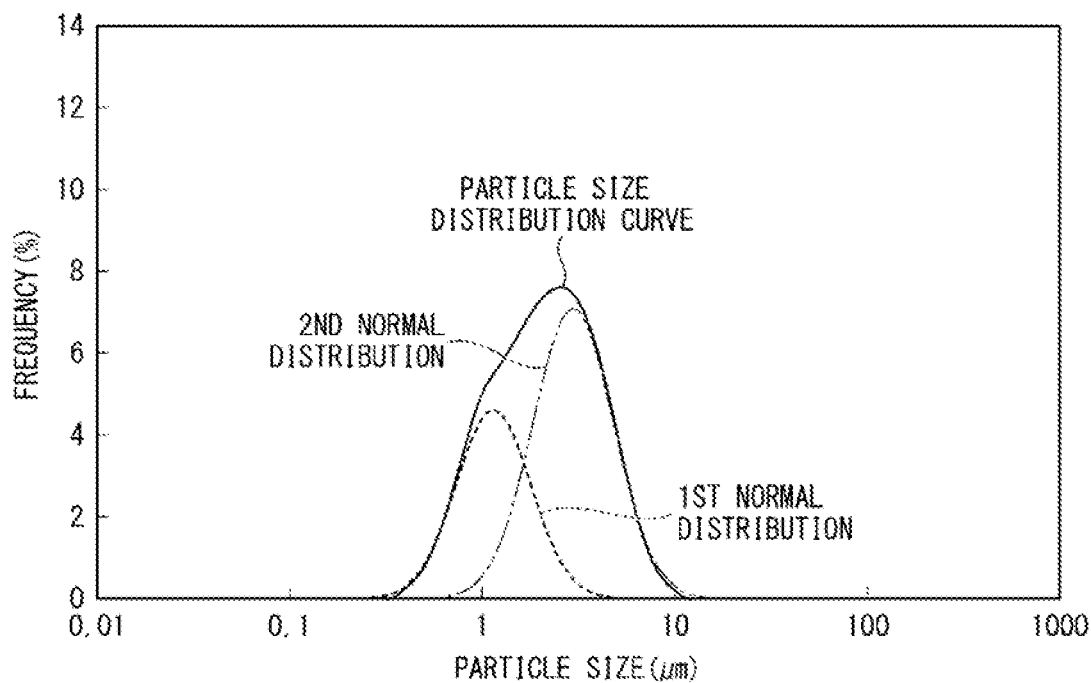
FIG. 5 is a graph showing a particle size distribution curve, a first normal distribution, and a second normal distribution in Example A5.

The blending amount of the conducting agent was changed from that in Example A1 to 5.0 parts by mass. Except this point, a positive electrode sheet was prepared in the same manner as in Example A1, and the particle size distribution was measured. The obtained particle size distribution curve is shown in FIG. 5.

Further, a non-aqueous electrolyte secondary battery was manufactured and evaluated in the same manner as in Example A1.

Example A6

The blending amounts of the conducting agent and the binder were changed from those in Example A2 to 6.0 parts by mass and 2.0 parts by mass, respectively. Except this point, a positive electrode sheet was prepared in the same manner as in Example A1, and the particle size distribution was measured.

Further, a non-aqueous electrolyte secondary battery was manufactured and evaluated in the same manner as in Example A1.

TABLE 1

| | POSITIVE ELECTRODE ACTIVE MATERIAL (1) | POSITIVE ELECTRODE ACTIVE MATERIAL (2) | POSITIVE ELECTRODE ACTIVE MATERIAL (3) | CONDUCTING AGENT (1) | BINDER UNIT |
|---|---|---|---|---|---|
| | PARTS BY MASS | PARTS BY MASS | PARTS BY MASS | PARTS BY MASS | PARTS BY MASS |
| Ex. 1 | 100 | — | — | 0.5 | 1.0 |
| Ex. 2 | — | 100 | — | 0.5 | 1.0 |
| Ex. 3 | — | — | 100 | 0.5 | 1.0 |
| Ex. 4 | — | 100 | — | — | 1.0 |
| Ex. 5 | 100 | — | — | 5.0 | 1.0 |
| Ex. 6 | — | 100 | — | 6.0 | 2.0 |

TABLE 2

| | | PARTICLE SIZE DISTRIBUTION CURVE | | | FIRST NORMAL DISTRIBUTION | VOLUME | |
|---|---|---|---|---|---|---|---|
| UNIT | PEAK NUMBER | INTEGRATED VALUE (a) FOR PARTICLE DIAMETERS OF 1 μm OR LESS vol. % | FREQUENCY (b) OF MODE DIAMETER vol. % | DISTRIBUTION WIDTH C μm | INTEGRATED VALUE (d) FOR PARTICLE DIAMETERS OF 1 μm OR LESS vol. % | DENSITY OF POSITIVE ELECTRODE ACTIVE MATERIAL LAYER g/cm$^3$ | 1,000-CYCLE CAPACITY RETENTION (50° C./5 C RATE) % |
| Ex. 1 | 1 | 7.4 | 11.6 | 2.8 | 8.7 | 2.30 | 82 |
| Ex. 2 | 1 | 11.4 | 9.9 | 2.7 | 19.9 | 2.40 | 79 |
| Ex. 3 | 2 | 3.4 | 9.7 | 22.4 | 4.5 | 2.20 | 76 |
| Ex. 4 | 1 | 9.2 | 12.1 | 3.2 | 15.0 | 2.50 | 87 |
| Ex. 5 | 2 | 17.8 | 7.6 | 1.3 | 44.2 | 2.20 | 41 |
| Ex. 6 | 2 | 34.1 | 8.6 | 1.0 | 55.9 | 2.10 | 23 |

As can be understood from the results shown in Table 2, excellent performance in terms of high temperature-high rate charge/discharge cycling performance was achieved in Examples A1 to A4 where the integrated value (a) was 3 to 15%, which is an integrated value of frequency of particle diameters of 1 μm or less, and the frequency (b) was 8 to 20%, which is a frequency of a mode diameter, each determined from the particle size distribution curve P.

Such results in Examples A1 to A4 are presumably due to the presence of less amount of fine powder in the positive electrode active material layer, which decreased side reaction sites where local current concentration occurs during the high-rate charge/discharge cycle, and thereby enabled suppression of deterioration when used at a high temperature.

On the other hand, in Examples A5 and A6, a large amount of fine powders was present in the positive electrode active material layer, and the high-rate charge/discharge cycling performance was inferior. The fine powder in the positive electrode active material layer is assumed to be small particles of the active material, which resulted due to insufficient crystal growth in the heat treatment step of the production process of the positive electrode active material, fine carbon particles, or a conducting agent present as isolated particles. Such inferior results are presumably due to the large surface area of fine powder, which provided many side reaction sites where local current concentration occurs during the high-rate charge/discharge cycle, and thereby facilitated deterioration when used at a high temperature.

<Measurement Method in Examples B1 to B5>
(Thickness Distribution Measuring Method)

A rectangular sample, which was 300 mm in a lengthwise direction (transportation direction during coating) and 180 mm in a widthwise direction orthogonal to the lengthwise direction, was cut out from the positive electrode sheet.

The thickness distribution was measured along the widthwise direction of the sample using a desktop thickness gauge (product name "Rotary Caliber Meter RC-19", manufactured by Maysun Co., Ltd.) and a sensor with a maximum measurable thickness of 200 μm. The sample was scanned from one end to the other end, and the measurement result obtained with respect to a region excluding 36 mm at both ends was adopted as the thickness distribution.

From the obtained thickness distribution, the average thickness a1, the maximum thickness b1 and the minimum thickness c1 as well as a thickness d1 which was the largest in terms of an absolute value of difference from the average thickness a1 were determined, and the values of (d1/a1) and (b1−c1) were calculated.

The thickness distribution in the lengthwise direction (transportation direction during coating) of the sample shows higher smoothness than the thickness distribution in the widthwise direction of the sample. That is, d2/a2 is closer to 1 than d1/a1, and b2−c2 is smaller than b1−c1. Therefore, the thickness distribution in the widthwise direction was adopted as the evaluation target.
(Particle Size Distribution Measuring Method)

The outermost surface of the positive electrode active material layer 12 with a depth of several μm was removed with a spatula or the like, and the resulting powder was dispersed in water to obtain a dispersion as a sample.

The measurement was implemented using a laser diffraction particle size distribution analyzer (product name "LA-960V2", manufactured by Horiba, Ltd.), and a flow cell. The sample was circulated, stirred and irradiated with ultrasonic waves (5 minutes), and the particle size distribution was measured while keeping the dispersion state sufficiently stable, thereby determining a volume-based median particle size D50.
(Volume Density Measuring Method)

The thickness of the positive electrode sheet and the thickness of the positive electrode current collector at its exposed section 13 were measured using a micrometer. Each thickness was measured at 5 arbitrarily chosen points, and an average value was calculated.

5 sheets of measurement samples were prepared by punching the positive electrode sheet into circles with a diameter of 16 mm.

Each measurement sample was weighed with a precision balance, and the mass of the positive electrode active material layer 12 in the measurement sample was calculated by subtracting the mass of the positive electrode current collector 11 measured in advance from the measurement result. The volume density of the positive electrode active material layer was calculated from the average value of measured values by the above formula (1).

<Evaluation Method in Examples B1 to B5>
(High Temperature-High Rate Cycle Test, DC Resistance Increase Rate Measurement)

The resistance increase rate was evaluated following the procedures (1) to (7) below.

(1) A non-aqueous electrolyte secondary battery (cell) was manufactured so as to have a rated capacity of 1 Ah, and a resistance measurement and a cycle evaluation were carried out at room temperature (25° C.).

(2) The obtained cell was charged at a constant current rate of 0.2 C (that is, 200 mA) and with a cut-off voltage of 3.6 V, and then charged at a constant voltage with a cut-off current set at 1/10 of the above-mentioned charge current (that is, 20 mA).

(3) The cell was discharged for capacity confirmation at a constant current rate of 0.2 C and with a cut-off voltage of 2.5 V. The discharge capacity at this time was set as the reference capacity, and the reference capacity was set as the current value at 1 C rate (that is, 1,000 mA).

(4) After charging the cell at a constant current at a cell's 3 C rate (that is, 3000 mA) and with a cut-off voltage of 3.8 V, a 10-minute pause was provided. From this state, the cell was discharged at 3 C rate and with a cut-off voltage of 2.0 V, and a 10-minute pause was provided. Supposing that the open circuit voltage at which this 3 C rate discharge was started is Va1, the voltage 10 seconds after the start of discharge is Va2, and the discharge current is I (that is, 3000 mA), the DC resistance is expressed by $R=(Va1-Va2)/I$, based on Ohm's law. According to this equation, the DC resistance at 10-second discharge was calculated.

(5) The 3 C rate charge/discharge test of (4) was repeated 1,000 times with the pause times after charging and discharging changed to 10 seconds.

(6) The same DC resistance measurement as in (4) was carried out.

(7) The DC resistance measured in (6) was divided by the value measured in (4) and the obtained value was converted into percentage to obtain the DC resistance increase rate (unit: %) after 1.000 cycles.

Examples B1 to B5

Examples B1 to B3 are implementation of the present invention, while Examples B4 and B5 are comparative examples.

The powder materials used for the positive electrode active material layer are a positive electrode active material and a conducting agent as described below.

Positive electrode active material: Carbon-coated lithium iron phosphate, average particle size 1.5 μm, carbon content 1.0% by mass Conducting agent: Carbon black Polyvinylidene fluoride (PVDF) was used as binder.

Example B1

First, a positive electrode current collector 11 was prepared by coating both the front and back surfaces of a positive electrode current collector main body 14 with current collector coating layers 15 by the following method. An aluminum foil (thickness 15 μm) was used as the positive electrode current collector main body 14.

A slurry was obtained by mixing 100 parts by mass of carbon black, 40 parts by mass of polyvinylidene fluoride as a binder, and N-methylpyrrolidone (NMP) as a solvent. The amount of NMP used was the amount required for applying the slurry.

The obtained slurry was applied to both sides of the positive electrode current collector main body 14 by a gravure method so as to allow the resulting current collector coating layers 15 after drying (total of layers on both sides) to have a thickness of 2 su, and dried to remove the solvent, thereby obtaining a positive electrode current collector 11. The current collector coating layers 15 on both surfaces were formed so as to have the same amount of coating and the same thickness.

Next, a positive electrode active material layer 12 was formed by the following method.

As shown in Table 3, 100 parts by mass of the positive electrode active material, 2.0 parts by mass of the conducting agent, 1.5 parts by mass of the binder, and NMP as a solvent were mixed with a mixer to obtain a positive electrode composition. The amount of the solvent used was the amount required for applying the positive electrode composition.

The positive electrode composition was applied on both sides of the positive electrode current collector 11, and after pre-drying, the applied composition was vacuum-dried at 120° C. to form positive electrode active material layers 12. The coating volume of the positive electrode composition was 30 mg/cm$^2$ (total volume for both sides). The positive electrode active material layers 12 on both surfaces of the positive electrode current collector 11 were formed so as to have the same coating amount and the same thickness. The obtained laminate was pressure-pressed with a load of 10 kN to obtain a positive electrode sheet.

Specifically, the positive electrode composition was applied using a bar coater while conveying the long positive electrode current collector 11 in the lengthwise direction, and a positive electrode sheet was continuously produced by a method that involves pressure-pressing using a roll press machine.

Figure 6:
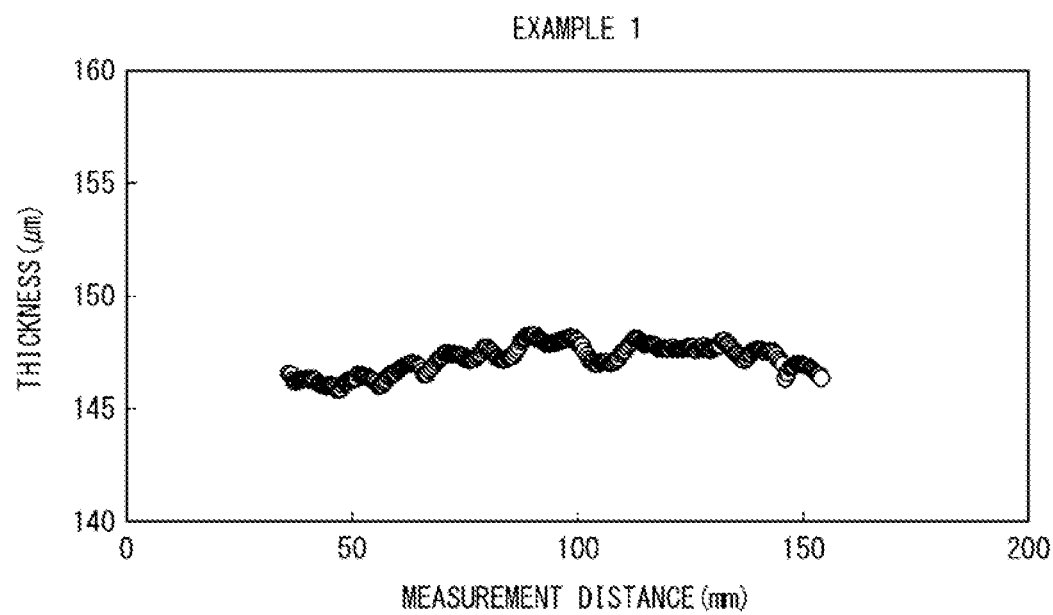
FIG. 6 is a graph showing the results of measurement of the thickness distribution in Example B1.

With respect to the obtained positive electrode sheet, the thickness distribution of the positive electrode, and the particle size distribution and volume density of the positive electrode active material layer were measured by the above methods, and the values of the respective items shown in Tables 4 were obtained. The measurement results of the thickness distribution are shown in FIG. 6.

The carbon content and compounding amount of the carbon-coated active material, the carbon content and compounding amount of the conducting agent, and the carbon content and compounding amount of the binder were used to calculate the conductive carbon content and the carbon content belonging to the binder with respect to the total mass of the positive electrode active material layer. The conducting agent was regarded as having an impurity content of less than the quantification limit and a carbon content of 100% by mass. The conductive carbon content and the carbon content belonging to the binder can also be confirmed by the method described in the <<Method for measuring conductive carbon content>> above. The results are shown in Table 4 (the same applies to the other examples).

The obtained positive electrode sheet was punched to obtain a positive electrode.

A non-aqueous electrolyte secondary battery having a configuration shown in FIG. 2 was manufactured by the following method.

LiPF$_6$ as an electrolyte was dissolved at 1 mol/L in a solvent in which ethylene carbonate (EC) and diethyl carbonate (DEC) were mixed at a volume ratio, EC:DEC, of 3:7, to thereby prepare a non-aqueous electrolytic solution.

The positive electrode obtained in this example and the negative electrode obtained in Production Example 1 were alternately laminated through a separator to prepare an electrode layered body with its outermost layer being the negative electrode. A polyolefin film (thickness 15 μm) was used as the separator.

In the step of producing the electrode layered body, the separator 2 and the positive electrode 1 were first stacked, and then the negative electrode 3 was stacked on the separator 2.

Terminal tabs were electrically connected to the exposed section 13 of the positive electrode current collector and the exposed section 33 of the negative electrode current collector in the electrode layered body, and the electrode layered body was put between aluminum laminate films while allowing the terminal tabs to protrude to the outside. Then, the resulting was laminate-processed and sealed at three sides.

To the resulting structure, a non-aqueous electrolytic solution was injected from one side left unsealed, and this one side was vacuum-sealed to manufacture a non-aqueous electrolyte secondary battery (laminate cell).

The high rate cycle test was carried out by the above method to measure the 1,000-cycle resistance increase rate. The results are shown in Table 4 (the same applies to the other examples).

Example B2

The blending ratio for the positive electrode composition was changed from that in Example B1 to that shown in Table 3. The load for the pressure-press was adjusted so as to give a volume density higher than Example B1.

Except this point, a positive electrode sheet was prepared, and the measurements and evaluations were carried out in the same manner as in Example B1.

Example B3

The conducting agent was omitted and the blending ratio for the positive electrode composition was changed from that in Example B1 to that shown in Table 3. The load for the pressure-press was adjusted so as to give a volume density higher than Examples B1 and B2.

Except this point, a positive electrode sheet was prepared, and the measurements and evaluations were carried out in the same manner as in Example B1.

Example B4

The blending ratio for the positive electrode composition was changed from that in Example B1 to that shown in Table 3. The load for the pressure-press was the same as in Example B2, but the volume density was 2.10 g/cm %, differing from Example B2 due to the increase in the amounts of the conducting agent and the binder.

Figure 7:
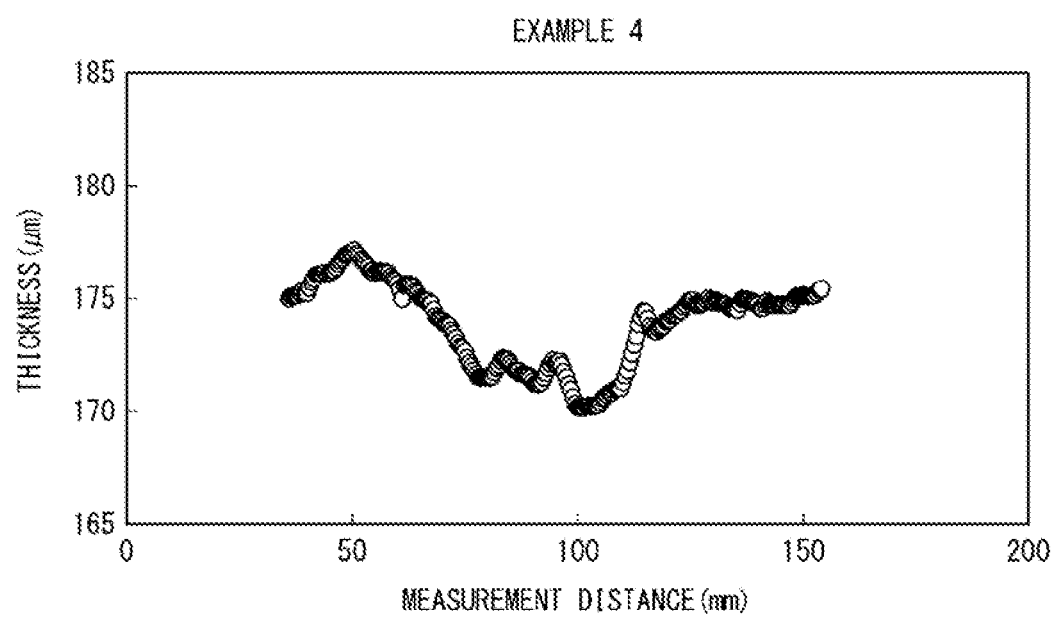
FIG. 7 is a graph showing the results of measurement of the thickness distribution in Example B4.

Except this point, a positive electrode sheet was prepared, and the measurements and evaluations were carried out in the same manner as in Example B1. The measurement results of the thickness distribution are shown in FIG. 7.

Example B5

The blending ratio for the positive electrode composition was changed from that in Example B1 to that shown in Table 3. The load for the pressure-press was the same as in Example B1, but the volume density was 2.00 g/cm$^3$, differing from Example B1 due to the increase in the amounts of the conducting agent and the binder. Except this point, a positive electrode sheet was prepared, and the measurements and evaluations were carried out in the same manner as in Example B1.

TABLE 3

| | BLENDING RATIO [PARTS BY MASS] | | | |
|---|---|---|---|---|
| | POSITIVE ELECTRODE ACTIVE MATERIAL | CONDUCTING AGENT | BINDER | SOLVENT |
| Ex. 1 | 96.5 | 2.0 | 1.5 | REQUIRED AMOUNT |
| Ex. 2 | 99.0 | 0.5 | 0.5 | |
| Ex. 3 | 99.5 | — | 0.5 | |
| Ex. 4 | 94.0 | 4.0 | 2.0 | |
| Ex. 5 | 94.0 | 4.0 | 2.0 | |

TABLE 4

| | AVERAGE THICK- NESS a1 μm | MAXI- MUM THICK- NESS b1 μm | MINI- MUM THICK- NESS c1 μm | d1 μm | d1/a1 — | b1 − c1 μm | D50 μm | CARBON CONTENT BELONGING TO BINDER % BY MASS | CONDUCTIVE CARBON CONTENT % BY MASS | VOLUME DENSITY g/cm$^3$ | 1,000- CYCLE, AC 1 Hz RESISTANCE INCREASE RATE % |
|---|---|---|---|---|---|---|---|---|---|---|---|
| Ex. 1 | 147.21 | 148.28 | 145.83 | 145.83 | 0.991 | 2.45 | 2.7 | 1.5 | 3.0 | 2.25 | 108 |
| Ex. 2 | 138.62 | 139.68 | 137.57 | 139.68 | 1.008 | 2.11 | 3.2 | 0.5 | 1.5 | 2.45 | 104 |
| Ex. 3 | 134.47 | 135.31 | 133.79 | 135.31 | 1.006 | 1.52 | 3.4 | 0.5 | 1.0 | 2.50 | 101 |
| Ex. 4 | 173.88 | 177.15 | 170.14 | 170.14 | 0.978 | 7.01 | 7.8 | 2.0 | 5.0 | 2.10 | 145 |
| Ex. 5 | 175.46 | 180.97 | 168.62 | 168.62 | 0.961 | 12.35 | 2.3 | 2.0 | 5.0 | 2.00 | 189 |

As can be understood from the results shown in Table 4, excellent performance in terms of high rate charge/discharge cycling performance Was achieved in Examples B1 to B3 satisfying the above formulae 1 to 4.

Examples B1 to B3 were excellent in the uniformity of the thickness in the planar direction of the positive electrode, and were excellent in the smoothness of the outermost surface of the positive electrode active material layer. This presumably allowed suppression of side reactions between the positive electrode and the electrolytic solution on the outermost surface of the positive electrode, whereby the deterioration in the high-rate charge/discharge cycle was suppressed.

In Example B2, as a result of reducing the blending amounts of the conducting agent and the binder as compared to Example B1, the value of b1−c1 decreased and the high-rate charge/discharge cycling performance improved further.

On the other hand, in Example B4, by increasing the blending amounts of the conducting agent and the binder as compared to Example B1, the agglomeration of the conducting agent and the binder occurred, and thickness in the planar direction of the positive electrode was less uniform than Example B1. This is presumably because the increase in the unevenness of the outermost surface of the positive electrode active material layer allowed side reactions to occur between the positive electrode and the electrolytic solution on the outermost surface of the positive electrode, whereby the resistance increase rate in the high-rate charge/discharge cycle increased.

In Example B5, since the D50 of the particles present in the positive electrode active material layer was small and the volume density was low, the unevenness on the outermost surface of the positive electrode active material layer increased. Further, the small D50 tends to induce agglomeration of the particles. This presumably facilitated side reactions between the positive electrode and the electrolytic solution on the outermost surface of the positive electrode, whereby the resistance increase rate in the high-rate charge/discharge cycle was further raised.

REFERENCE SIGNS LIST

1 Positive electrode
2 Separator
3 Negative electrode
5 Outer casing
10 Non-aqueous electrolyte secondary cell
11 Positive electrode current collector
12 Positive electrode active material layer
13 Exposed section of positive electrode current collector
14 Positive electrode current collector main body
15 Current collector coating layer
31 Negative electrode current collector
32 Negative electrode active material layer
33 Exposed section of negative electrode current collector

The invention claimed is:

1. A positive electrode for a non-aqueous electrolyte secondary battery, comprising a positive electrode current collector and a positive electrode active material layer provided on the positive electrode current collector, wherein:
the positive electrode active material layer comprises a positive electrode active material; and
an integrated value (a) is 3 to 15%, which is an integrated value of frequency of particle diameters of 1 µm or less, and a frequency (b) is 8 to 20%, which is a frequency of a diameter with a maximum frequency, each determined from a volume-based particle size distribution curve of particles present in the positive electrode active material layer.

2. The positive electrode according to claim 1, wherein a single peak is present in the particle size distribution curve with frequency as an ordinate.

3. The positive electrode for a non-aqueous electrolyte secondary battery according to claim 1, which has a distribution width (c) of 2.0 to 20.0 µm, which is a value obtained by subtracting a 10% diameter from a 90% diameter in a first normal distribution with a smaller average diameter of two normal distributions obtained by waveform separation of the particle size distribution curve with frequency as an ordinate.

4. The positive electrode according to claim 1, which has an integrated value (d) of 1 to 30%, which is an integrated value of frequency of particle diameters of 1 µm or less in a first normal distribution with a smaller average diameter of two normal distributions obtained by waveform separation of the particle size distribution curve with frequency as an ordinate.

5. The positive electrode according to claim 1, wherein the positive electrode active material comprises a compound represented by a formula $LiFe_xM_{(1-x)}PO_4$, wherein $0 \leq x \leq 1$, M is Co, Ni, Mn, Al, Ti or Zr.

6. The positive electrode according to claim 1, wherein the positive electrode active material has, on at least a part of its surface, a coated section comprising a conductive material.

7. The positive electrode according to claim 1, wherein the positive electrode active material layer further comprises a conducting agent.

8. The positive electrode according to claim 1, wherein the positive electrode active material layer does not contain a conducting agent.

9. The positive electrode according to claim 1, wherein a current collector coating layer is present on a surface of the positive electrode current collector on a side of the positive electrode active material layer.

10. A non-aqueous electrolyte secondary battery, comprising the positive electrode of claim 1, a negative electrode, and a non-aqueous electrolyte disposed between the positive electrode and the negative electrode.

11. A battery module or battery system comprising a plurality of the non-aqueous electrolyte secondary batteries of claim 10.

* * * * *